United States Patent
Castañeda Fernandez et al.

(10) Patent No.: US 11,115,095 B1
(45) Date of Patent: Sep. 7, 2021

(54) FINITE-ALPHABET BEAMFORMING FOR MULTI-ANTENNA WIDEBAND SYSTEMS

(71) Applicant: Cornell University, Ithaca, NY (US)

(72) Inventors: Oscar Fernando Castañeda Fernandez, New York, NY (US); Christoph Emanuel Studer, New York, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 16/809,813

(22) Filed: Mar. 5, 2020

(51) Int. Cl.
*H04B 7/06* (2006.01)
*H04B 7/0452* (2017.01)
*H04L 25/02* (2006.01)
*H04B 7/0456* (2017.01)
*H04L 25/03* (2006.01)
*H04B 7/0404* (2017.01)

(52) U.S. Cl.
CPC ......... *H04B 7/0617* (2013.01); *H04B 7/0404* (2013.01); *H04B 7/0452* (2013.01); *H04B 7/0456* (2013.01); *H04L 25/0202* (2013.01); *H04L 25/03936* (2013.01)

(58) Field of Classification Search
CPC ........ H04B 7/0617; H04B 7/04; H04B 7/061; H04L 27/2601; H04L 5/0007; A61B 18/1815
USPC .......................................................... 375/267
See application file for complete search history.

(56) References Cited

U.S. PATENT DOCUMENTS

| | | | | |
|---|---|---|---|---|
| 10,812,125 B1 * | 10/2020 | Badic | ..................... | H04W 52/30 |
| 2005/0024540 A1 * | 2/2005 | Kim | ..................... | H04B 7/0851 |
| | | | | 348/614 |
| 2006/0269023 A1 * | 11/2006 | Chimitt | ................ | H04B 1/1036 |
| | | | | 375/350 |
| 2008/0235311 A1 * | 9/2008 | Budianu | ............. | H04L 25/0232 |
| | | | | 708/290 |

(Continued)

OTHER PUBLICATIONS

Terry et al. "Convergence Analysis of Finite Alphabet Beamformers for Digital Cochannel Signals", IEEE Transactions on Communications, vol. 51, No. 6, Jun. 2003 (Year: 2003).*

(Continued)

*Primary Examiner* — Leila Malek
(74) *Attorney, Agent, or Firm* — Withrow & Terranova, PLLC

(57) ABSTRACT

Finite-alphabet beamforming for multi-antenna wideband systems is provided. The combination of massive multi-user multiple-input multiple-output (MU-MIMO) technology and millimeter-wave (mmWave) communication enables unprecedentedly high data rates for radio frequency (RF) communications. In such systems, beamforming must be performed at extremely high rates over hundreds of antennas. For example, spatial equalization applies beamforming in the uplink to mitigate interference among user equipment (UEs) at a base station (BS). Finite-alphabet equalization provides a new paradigm that restricts the entries of a spatial equalization matrix to low-resolution numbers, enabling high-throughput, low-power, and low-cost equalization hardware. Similarly, precoding applies beamforming in the downlink to maximize the reception of a signal transmitted from a BS to a target UE. Finite-alphabet precoding can be applied in the downlink to similarly improve power and cost in precoding hardware.

21 Claims, 15 Drawing Sheets

(56) References Cited

U.S. PATENT DOCUMENTS

2013/0114001 A1* 5/2013 Kweon ............ H04N 21/4402
348/723

OTHER PUBLICATIONS

Wang et al. "Hybrid Precoderand Combiner Design With Low-Resolution Phase Shifters in mmWave MIMO Systems", IEEE Journal of Selected Topics in Signal Processing, vol. 12, No. 2, May 2018 (Year: 2018).*

Ando, K. et al., "BRein Memory: A Single-Chip Binary/Ternary Reconfigurable in-Memory Deep Neural Network Accelerator Achieving 1.4 TOPS at 0.6 W," IEEE Journal of Solid-State Circuits (JSSC), vol. 53, No. 4, Apr. 2018, IEEE, pp. 983-994.

Andoni, A. et al., "Near-Optimal Hashing Algorithms for Approximate Nearest Neighbor in High Dimension," Communications of the ACM, vol. 51, No. 1, Jan. 2008, pp. 117-122.

Annovi, A. et al., "Characterization of an Associative Memory Chip in 28 nm CMOS Technology," 2018 IEEE International Symposium on Circuits and Systems (ISCAS), May 27-30, 2018, Florence, Italy, 5 pages.

Aga, S. et al., "Compute Caches," 2017 IEEE International Symposium on High Performance Computer Architecture (HPCA), Feb. 4-8, 2017, Austin, TX, USA, IEEE, 12 pages.

Arikan, E., "Channel Polarization: A Method for Constructing Capacity-Achieving Codes," IEEE International Symposium on Information Theory (ISIT), Jul. 6-11, 2008, Toronto, Canada, IEEE, pp. 1173-1177.

Bankman, D. et al., "An always-on 3.8 J/86% CIFAR-10 mixed-signal binary CNN processor with all memory on chip in 28nm CMOS," IEEE Journal of Solid-State Circuits, Feb. 11-15, 2018, San Francisco, CA, USA, pp. 222-224.

Conti, F. et al., "XNOR Neural Engine: a Hardware Accelerator IP for 21.6 fJ/op Binary Neural Network Inference," IEEE Transactions on Computer-Aided Design of Integrated Circuits and Systems, vol. 37, Issue 11, Nov. 2018, IEEE, 11 pages.

Daemen, J. et al., "The Design of Rijndael: AES—The Advanced Encryption Standard," Springer-Verlag Berlin Heidelberg GmbH, 2002, 243 pages.

Eckert, C. et al., "Neural Cache: Bit-Serial In-Cache Acceleration of Deep Neural Networks," IEEE Micro, vol. 39, Issue 3, May-Jun. 2019, IEEE, 6 pages.

Goldstein, T. et al., "The Stone Transform: Multi-Resolution ImageEnhancement and Compressive Video," IEEE Transactions on Image Processing, vol. 24, Issue 12, Dec. 2015, IEEE, 13 pages.

Hubara, I. et al., "Binarized Neural Networks," Proceedings of the 30th International Conference on Neural Information Processing Systems (NIPS 2016), Dec. 2016, Barcelona, Spain, 9 pages.

Kim, D. et al., "Neurocube: A Programmable Digital Neuromorphic Architecture with High-Density 3D Memory," ACM/IEEE 43rd Annual International Symposium on Computer Architecture (ISCA), Jun. 18-22, 2016, Seoul, South Korea, IEEE Computer Society, pp. 380-392.

Lee J. et al., "UNPU: An Energy-Efficient Deep Neural Network Accelerator With Fully Variable Weight Bit Precision," IEEE Journal of Solid-State Circuits, vol. 54, Issue 1, Jan. 2019, pp. 173-185.

Pagiamtzis, K. et al., "Content-Addressable Memory (CAM) Circuits and Architectures: A Tutorial and Survey," IEEE Journal of Solid-State Circuits, vol. 41, No. 3, Mar. 2006, IEEE, pp. 712-727.

Pei, T.-B. et al., "VLSI Implementation of Routing Tables: Tries and CAMs," Conference on Computer Communications, Tenth Annual Joint Conference of the IEEE Computer and Communications Societies Proceedings, Apr. 7-11, 1991, Bal Harbour, FL, USA, IEEE, pp. 0515-0524.

Zhang, M. et al., "Highly-Associative Caches for Low-Power Processors," Kool Chips Workshop, 33rd International Symposium on Microarchitecture, Dec. 2000, Monterey, CA, 6 pages.

Agrell, E., et al., "Closest point search in lattices," IEEE Transactions on Information Theory, vol. 48, No. 8, Aug. 2002, pp. 2201-2214.

Alkhateeb, A., et al., "MIMO precoding and combining solutions for millimeter-wave systems," IEEE Communications Magazine, vol. 52, No. 12, Dec. 2014, pp. 122-131.

Author Unknown, "5G; NR; Base Station (BS) radio transmission and reception," 3GPP Technical Specification 38.104, version 15.5.0, release 15, European Telecommunications Standards Institute, May 2019, 219 pages.

Balatsoukas-Stimming, A., et al., "Neural-network optimized 1-bit precoding for massive MU-MIMO," 2019 IEEE 20th International Workshop on Signal Processing Advances in Wireless Communications, Cannes, France, Jul. 2-5, 2019, 5 pages.

Beck, A., et al., "A fast iterative shrinkage-thresholding algorithm for linear inverse problems," Society for Industrial and Applied Mathematics Journal on Imaging Sciences, vol. 2, No. 1, Jan. 2009, pp. 183-202.

Björnson, E., et al., "Massive MIMO in sub-6 GHz and mmWave: Physical, practical, and use-case differences," IEEE Wireless Communications Magazine, vol. 26, No. 2, Apr. 2019, pp. 100-108.

Castañeda, O., et al., "1-bit massive MU-MIMO precoding in VLSI," IEEE Journal on Emerging and Selected Topics in Circuits and Systems, vol. 7, No. 4, Dec. 2017, pp. 508-522.

Castañeda, O., et al., "Data detection in large multi-antenna wireless systems via approximate semidefinite relaxation," IEEE Transactions on Circuits and Systems I: Regular Papers, vol. 63, No. 12, Dec. 2016, pp. 2334-2346.

Castañeda, O., et al., "PPAC: A versatile in-memory accelerator for matrix-vector-product-like operations," 2019 IEEE 30th International Conference on Application-specific Systems, Architectures and Processors, New York, NY, Jul. 15-17, 2019, 8 pages.

Castañeda, O., et al., "VLSI design of a 3-bit constant-modulus precoder for massive MU-MIMO," 2018 IEEE International Symposium on Circuits and Systems, Florence, Italy, May 4, 2018, 5 pages.

Chang, T.-H., et al., "A linear fractional semidefinite relaxation approach to maximum-likelihood detection of higher-order QAM OSTBC in unknown channels," IEEE Transactions on Signal Processing, vol. 58, No. 4, Apr. 2010, pp. 2315-2326.

Dutta, S., et al., "A case for digital beamforming at mmWave," Jan. 24, 2019, https://arxiv.org/pdf/1901.08693.pdf, 30 pages.

Fatema, N., et al., "Massive MIMO linear precoding: A survey," IEEE Systems Journal, vol. 12, No. 4, Dec. 2018, pp. 3920-3931.

Fincke, U., et al., "Improved methods for calculating vectors of short length in a lattice, including a complexity analysis," Mathematics of Computation, vol. 44, No. 170, Apr. 1985, pp. 463-471.

Goldstein, T., et al., "A field guide to forward-backward splitting with a FASTA implementation," https://arxiv.org/pdf/1411.3406v1.pdf, Nov. 12, 2014, 17 pages.

Goldstein, T., et al., "High-order methods for basis pursuit," UCLA Computational Applied Mathematics (CAM) Report, Jul. 2010, 17 pages.

Guo, Q., et al., "AC-DIMM: Associative computing with STT-MRAM," ACM SIGARCH Computer Architecture News, vol. 41, No. 3, Jun. 2013, pp. 189-200.

Jacobsson, S. et al., "Nonlinear 1-bit precoding for massive MU-MIMO with higher order modulation," 2016 50th Asilomar Conference on Signals, Systems and Computers, Nov. 6-9, 2018, Pacific Grove, CA, pp. 763-767.

Jacobsson, S., et al., "Quantized precoding for massive MU-MIMO," IEEE Transactions on Communications, vol. 65, No. 11, Nov. 2017, pp. 4670-4684.

Jacobsson, S., et al., "Throughput analysis of massive MIMO uplink with low-resolution ADCs," IEEE Transactions on Wireless Communications, vol. 16, No. 6, Jun. 2017, pp. 4038-4051.

Jaeckel, S., et al., "QuaDRiGa: A 3-D multi-cell channel model with time evolution for enabling virtual field trials," IEEE Transactions on Antennas and Propagation, vol. 62, No. 6, Jun. 2014, pp. 3242-3256.

(56) References Cited

OTHER PUBLICATIONS

Jia, H., et al., "A microprocessor implemented in 65nm CMOS with configurable and bit-scalable accelerator for programmable in-memory computing," https://arxiv.org/ftp/arxiv/papers/1811/1811.04047.pdf, Nov. 2018, 10 pages.

Joham, M., et al., "Linear transmit processing in MIMO communications systems," IEEE Transactions on Signal Processing, vol. 53, No. 8, Aug. 2005, pp. 2700-2712.

Larsson, E.G., et al., "Massive MIMO for next generation wireless systems," IEEE Communications Magazine, vol. 52, No. 2, Feb. 2014, pp. 186-195.

Li, S., et al., "DRISA: A DRAM-based reconfigurable in-situ accelerator," 5-th Annual IEEE/ACM Sympoium on Microartchitecture, Oct. 14-18, 2017, Cambridge, MA, pp. 288-301.

Luo, Z., et al., "Semidefinite relaxation of quadratic optimization problems," IEEE Signal Processing Magazine, vo. 27, No. 3, May 2010, pp. 20-34.

Mo, J., et al., "Capacity analysis of one-bit quantized MIMO systems with transmitter channel state information," IEEE Transactions on Signal Processing, vol. 63, No. 20, Oct. 15, 2015, pp. 5498-5512.

Mo. J., et al., "Hybrid architectures with few-bit ADC receivers: Achievable rates and energy rate tradeoffs," IEEE Transactions on Wireless Communications, vol. 16, No. 4, Apr. 2017, pp. 2274-2287.

Nair, R., "Evolution of memory architecture," Proceedings of the IEEE, vol. 103, No. 8, Aug. 2015, pp. 1331-1345.

Parikh, N., et al., "Proximal algorithms," Foundations and Trends in Optimization, vol. 1, No. 3, 2013, pp. 123-231.

Paulraj, A., et al., "Introduction to space-time wireless communications," Cambridge University Press, May 29, 2003, 277 pages.

Petersen, K. B., et al., "The matrix cookbook," Nov. 15, 2012, 72 pages.

Pi, Z., et al., "An introduction to millimeter-wave mobile broadband systems," IEEE Communications Magazine, vol. 49, No. 6, Jun. 2011, pp. 101-107.

Rappaport, T.S., et al., "Millimeter wave mobile communications for 5G cellular: It will work!," IEEE Access, vol. 1, May 2013, pp. 335-349.

Roh, W., et al., "Millimeter-wave beamforming as an enabling technology for 5G cellular communications: Theoretical feasibility and prototype results," IEEE Communications Magazine, vol. 52, No. 2, Feb. 2014, pp. 106-113.

Roth, K., et al., "Achievable rate and energy efficiency of hybrid and digital beamforming receivers with low resolution ADC," IEEE Journal on Selected Areas in Communications, vol. 35, No. 9, Sep. 2017, pp. 2056-2068.

Rusek, F., et al., "Scaling up MIMO: Opportunities and challenges with very large arrays," IEEE Signal Process Magazine, vol. 30, No. 1, Jan. 2013, pp. 40-60.

Sadhu, B., et al., "A 28GHz 32-element phased-array transceiver IC with concurrent dual polarized beams and 1.4 degree beam-steering resolution for 5G communication," 2017 IEEE International Solid-State Circuits Conference, Feb. 2017, pp. 128-129.

Shah, S., et al., "Biconvex relaxation for semidefinite programming in computer vision," European Conference on Computer Vision (ECCV), Sep. 2016, pp. 717-735.

Studer, C. et al., "ASIC implementation of soft-input soft-output MIMO detection using MMSE parallel interference cancellation," IEEE Journal of Solid-State Circuits, vol. 46, No. 7, Jul. 2011, pp. 1754-1765.

Studer, C., et al., "Quantized massive MU-MIMO-OFDM uplink," IEEE Transactions on Communications, vol. 64, No. 6, Jun. 2016, pp. 2387-2399.

Swindlehurst, A.L., et al., "Millimeterwave massive MIMO: The next wireless revolution?," IEEE Communications Magazine, vol. 52, No. 9, Sep. 2014, pp. 56-62.

Tse, D., et al., "Fundamentals of Wireless Communication," Cambridge University Press, Jun. 27, 2005, 586 pages.

Tuchler, M., et al.,"Minimum mean squared error equalization using a priori information," IEEE Transactions on Signal Processing, vol. 50, No. 3, Mar. 2002, pp. 673-683.

Verdu, S., "Computational complexity of optimum multiuser detection," Algorithmica, vol. 4, No. 1, Jun. 1989, pp. 303-312.

Wu, M., et al., "High-throughput data detection for massive MU-MIMO-OFDM using coordinate descent," IEEE Transactions on Circuits and Systems I: Regular Papers, vol. 63, No. 12, Dec. 2016, pp. 2357-2367.

Wu, M., et al., "Large-scale MIMO detection for 3GPP LTE: Algorithm and FPGA implementation," IEEE Journal of Selected Topics in Signal Processing, vol. 8, No. 5, Oct. 2014, pp. 916-929.

Wulf, W. A., et al., "Hitting the memory wall: Implications of the obvious,"ACM SIGARCH Computer Architecture News, vol. 23, No. 1, Mar. 1995, pp. 20-24.

Yan, H., et al., "Performance, power, and area design trade-offs in millimeter-wave transmitter beamforming architectures," IEEE Circuits and Systems Magazine, vo. 19, No. 2, May 2019, pp. 33-58.

Zimmerman, R., "Computer arithmetic: Principles, architectures, and VLSI design," Integrated Systems Laboratory, Swiss Federal Institute of Technology (ETH), Zürich, Switzerland, Mar. 16, 1999, 26 pages.

* cited by examiner

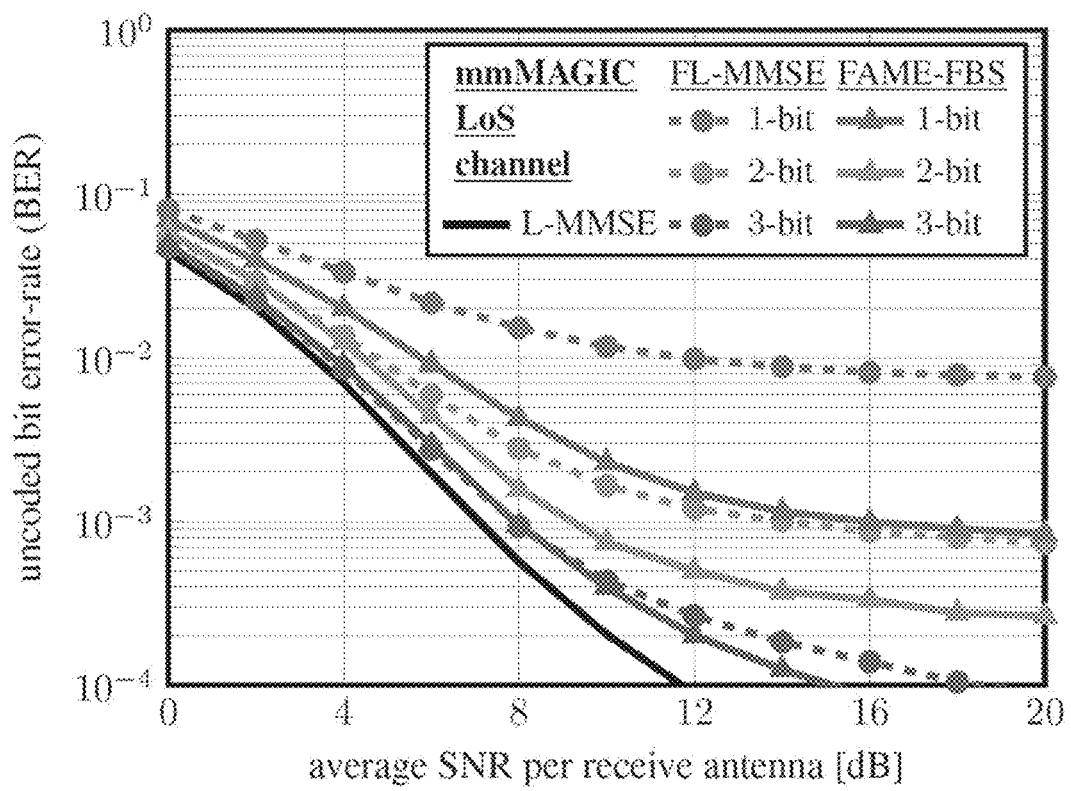
*FIG. 7C*
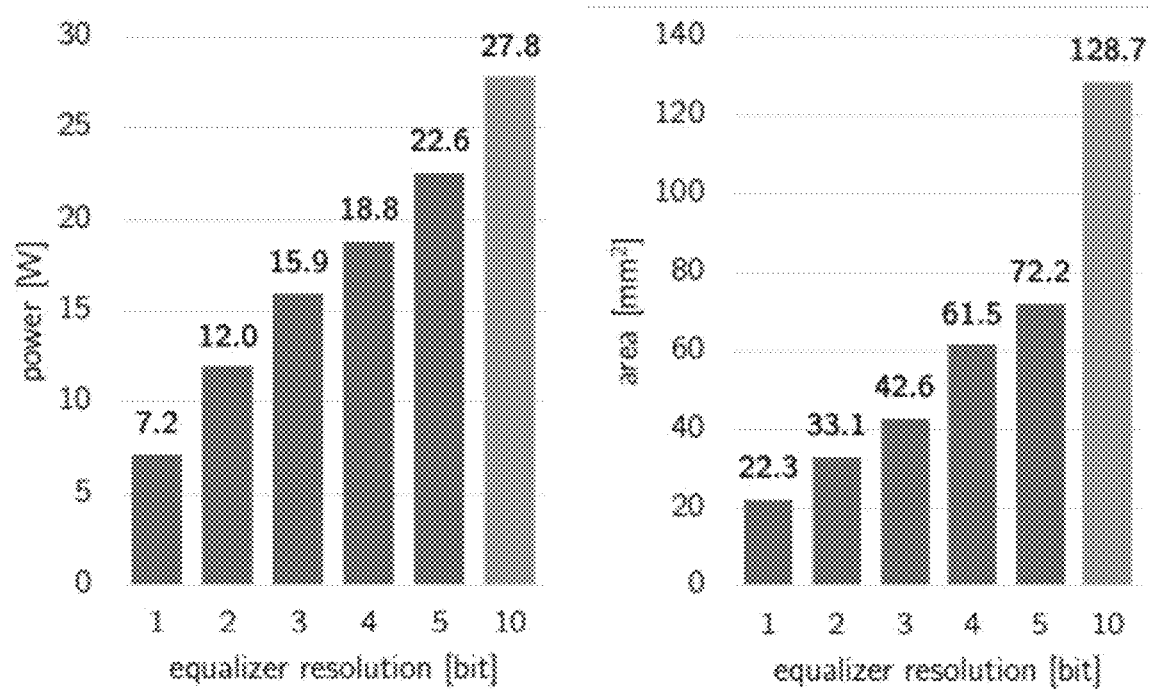
*FIG. 8A*          *FIG. 8B*

FINITE-ALPHABET BEAMFORMING FOR MULTI-ANTENNA WIDEBAND SYSTEMS

GOVERNMENT SUPPORT

This invention was made with government funds under Agreement No. HR0011-18-3-0004 awarded by The Defense Advanced Research Projects Agency (DARPA). The U.S. Government has certain rights in this invention.

FIELD OF THE DISCLOSURE

The present disclosure relates to equalization of radio frequency (RF) signals in multi-antenna RF systems and devices.

BACKGROUND

Future wireless systems are expected to deliver higher data-rates within the already crowded radio frequency (RF) spectrum. Emerging technologies, such as millimeter-wave (mmWave) or terahertz (THz) communication and massive multi-user multiple-input multiple-output (MU-MIMO), have risen as promising candidates to provide such high data rates. An abundance of available bandwidth at mmWave and THz frequencies, combined with fine-grained beamforming capabilities provided by massive MU-MIMO, can enable high-throughput communication to multiple user equipments (UEs) in a same time-frequency resource. However, these technologies require hundreds of antennas at a base station (BS), each receiving or transmitting wideband signals, which necessitates sophisticated RF and digital baseband processing circuitry. As a result, circuit power consumption and system costs may increase significantly, which may hamper the success of this technology.

To reduce power consumption, the literature has largely focused on multi-antenna mmWave and THz architectures that rely on hybrid analog-digital solutions. Albeit energy efficient, such architectures have limited multiplexing capabilities as they are only capable of simultaneously combining signals coming from a restricted number of directions; this key limitation may result in a reduced spectral efficiency. An emerging alternative is the use of all-digital BS architectures. While it is commonly believed that all-digital BS designs would be energy inefficient, it has been shown recently that the power consumption of the RF and data-conversion elements in an all-digital BS is comparable to that of hybrid solutions, provided that the resolution of the data converters at the BS is suitably reduced. However, power consumption and system costs of baseband processing for all-digital BS architectures are largely unexplored.

FIG. 1 is a schematic diagram of a traditional MU-MIMO wireless communication system 10 including multiple UEs 12 and a BS 14. Spatial equalization in the uplink (UEs 12 transmit to BS 14) is among the most power- and throughput-critical tasks in all-digital BS architectures. The purpose of spatial equalization is to collect the signals from all U UEs 12 at B BS antennas 16, while suppressing inter-UE interference. Mathematically, spatial equalization amounts to one or multiple U×B matrix-vector multiplications involving a U×B equalization matrix and a B-dimensional received vector. These multiplications need to be performed on a per-baseband-sample basis (e.g., at the sample rate of analog-to-digital converters in the BS 14).

Unfortunately, for a BS 14 with a large array of antennas 16 serving multiple UEs 12, a conventional matrix-vector-product circuit operating consumes a large amount of power. For example, a BS 14 with B=256 antennas 16 serving U=16 UEs 12 which uses a conventional processing circuit at 2 G vectors/second consumes over 28 watts (W) and occupies more than 128 square millimeters ($mm^2$) when implemented in a 28 nanometer (nm) complementary metal-oxide-semiconductor (CMOS). If more BS antennas 16 and/or more UEs 12 are considered, circuit power and area increase even further.

SUMMARY

Finite-alphabet beamforming for multi-antenna wideband systems is provided. The combination of massive multi-user multiple-input multiple-output (MU-MIMO) technology and millimeter-wave (mmWave) communication enables unprecedentedly high data rates for radio frequency (RF) communications. In such systems, beamforming must be performed at extremely high rates over hundreds of antennas. For example, spatial equalization applies beamforming in the uplink to mitigate interference among user equipment (UEs) at a base station (BS). Conventional hardware designs of spatial equalizers in all-digital BSs, where each antenna is equipped with a pair of data converters, would entail prohibitively high power consumption and implementation costs. To address these issues, finite-alphabet equalization provides a new paradigm that restricts the entries of a spatial equalization matrix to low-resolution numbers, enabling high-throughput, low-power, and low-cost equalization hardware.

Similarly, precoding applies beamforming in the downlink to maximize the reception of a signal transmitted from a BS to a target UE. Finite-alphabet precoding can be applied in the downlink to similarly improve power and cost in precoding hardware.

To minimize the performance loss of finite-alphabet equalization, embodiments generate an equalization matrix using finite-alphabet minimum mean-square error (MMSE) equalization (FAME), which significantly outperforms a nave quantization of a linear MMSE matrix. A similar approach is applied to replace part of linear Wiener filter (WF) precoding matrices with a finite-alphabet WF precoding (FAWP) matrix for the downlink. Efficient algorithms can be deployed to quantize solutions to a non-deterministic polynomial-time (NP)-hard FAME/FAWP problem defined herein. Through this, it is shown that for massive MU-MIMO mmWave systems, near-optimal error-rate performance can be achieved with equalization coefficients quantized to only 1-3 bits. In addition, very-large scale integration (VLSI) results demonstrate a reduction in equalization power and area by at least a factor of 3.9× and 5.8×, respectively, over traditional approaches.

An exemplary embodiment provides a method for digitally beamforming signals for an antenna array. The method includes estimating a wireless channel associated with a plurality of digital baseband signals and an antenna array to produce estimates for the wireless channel. The method further includes beamforming, with a finite-alphabet equalizer, the plurality of digital baseband signals based on the estimates of the wireless channel.

Another exemplary embodiment provides a radio access node. The radio access node includes an antenna array and channel estimator circuitry coupled to the antenna array and configured to provide an estimate of a wireless channel associated with a plurality of digital baseband signals for the antenna array. The radio access node further includes finite-alphabet beamforming circuitry coupled to the antenna array and the channel estimator circuitry, the finite-alphabet beamforming circuitry being configured to beamform the plurality of digital baseband signals in accordance with the estimation of the wireless channel.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 7C is a graphical representation of uncoded BER for a 256 antenna, 16 UE scenario using 16-QAM and an LoS QuaDRiGa mmWave channel model under various equalization approaches.

FIG. 8A is a graphical representation of power as a function of equalizer resolution for a finite-alphabet equalizer hardware designed in 28 nanometer (nm) complementary metal-oxide-semiconductor (CMOS) technology for a 256 antenna, 16 UE massive MU-MIMO embodiment of the wireless communication system of FIG. 2.

FIG. 8B is a graphical representation of area as a function of equalizer resolution for the finite-alphabet equalizer hardware of FIG. 8A.

DETAILED DESCRIPTION

Figure 1:
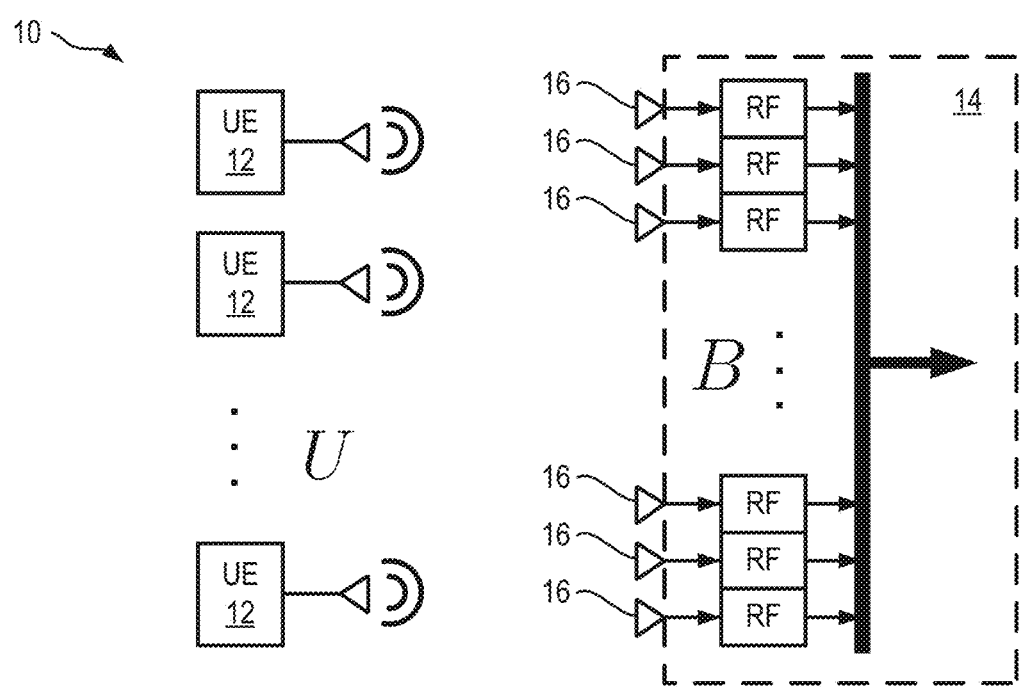
FIG. 1 is a schematic diagram of a traditional multi-user multiple-input multiple-output (MU-MIMO) wireless communication system including multiple user equipments (UEs) and a base station (BS).

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Finite-alphabet beamforming for multi-antenna wideband systems is provided. The combination of massive multi-user multiple-input multiple-output (MU-MIMO) technology and millimeter-wave (mmWave) communication enables unprecedentedly high data rates for radio frequency (RF) communications. In such systems, beamforming must be performed at extremely high rates over hundreds of antennas. For example, spatial equalization applies beamforming in the uplink to mitigate interference among user equipment (UEs) at a base station (BS). Conventional hardware designs of spatial equalizers in all-digital BSs, where each antenna is equipped with a pair of data converters, would entail prohibitively high power consumption and implementation costs. To address these issues, finite-alphabet equalization provides a new paradigm that restricts the entries of a spatial equalization matrix to low-resolution numbers, enabling high-throughput, low-power, and low-cost equalization hardware.

Similarly, precoding applies beamforming in the downlink to maximize the reception of a signal transmitted from a BS to a target UE. Finite-alphabet precoding can be applied in the downlink to similarly improve power and cost in precoding hardware.

To minimize the performance loss of finite-alphabet equalization, embodiments generate an equalization matrix using finite-alphabet minimum mean-square error (MMSE) equalization (FAME), which significantly outperforms a naïve quantization of a linear MMSE matrix. A similar approach is applied to replace part of linear Wiener filter (WF) precoding matrices with a finite-alphabet WF precoding (FAWP) matrix for the downlink. Efficient algorithms can be deployed to quantize solutions to a non-deterministic polynomial-time (NP)-hard FAME/FAWP problem defined herein. Through this, it is shown that for massive MU-MIMO mmWave systems, near-optimal error-rate performance can be achieved with equalization coefficients quantized to only 1-3 bits. In addition, very-large scale integration (VLSI) results demonstrate a reduction in equalization power and area by at least a factor of 3.9× and 5.8×, respectively, over traditional approaches.

Figure 2:
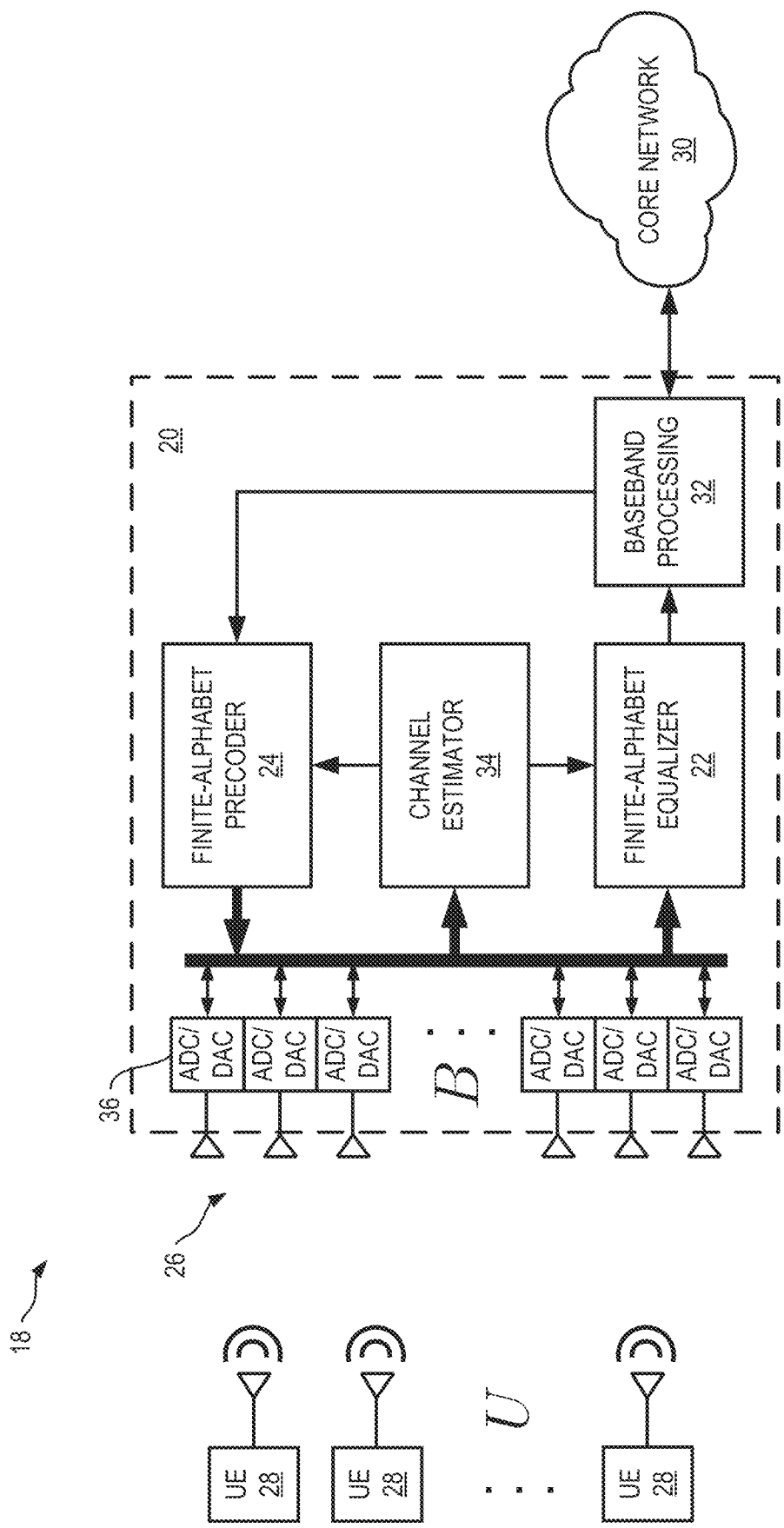
FIG. 2 is a schematic diagram of a wireless communication system with a radio access node having finite-alphabet beamforming circuitry.

FIG. 2 is a schematic diagram of a wireless communication system 18 with a radio access node 20 having finite-alphabet beamforming circuitry. The finite-alphabet beamforming circuitry can include a finite-alphabet equalizer 22 and/or a finite-alphabet precoder 24. The radio access node 20 can be any node in a radio access network (RAN) of the wireless communications system 18 (e.g., a cellular communications network) which can transmit and/or receive RF signals. In some examples, the radio access node 20 is a BS (e.g., a New Radio (NR) BS (gNB) in a Third Generation Partnership Project (3GPP) Fifth Generation (5G) NR network), a low-power BS (e.g., a micro BS or a pico BS), or a relay node. In some examples, the radio access node 20 is a network node that implements part of the functionality of a BS (e.g., a network node that implements a gNB central unit (gNB-CU) or a network node that implements a gNB distributed unit (gNB-DU)) or a network node that implements part of the functionality of some other type of radio access node.

In an exemplary aspect, the radio access node 20 includes an antenna array 26 (e.g., having B antennas), which can be operated for MU-MIMO communication with multiple UEs 28 (e.g., U UEs 28). Accordingly, the radio access node 20 is configured to perform spatial equalization in uplink communications (e.g., communications from the UEs 28 to a core network 30 of the wireless communications system 18). The purpose of spatial equalization is to beamform received signals by collecting the signals from all U UEs 28 at B antennas of the antenna array 26, while suppressing inter-UE interference. After this beamforming, these signals may be further processed via baseband processing circuitry 32 and forwarded to the core network 30. In some embodiments, the radio access node 20 is further configured to perform precoding in downlink communications (e.g., from the core network 30 to the UEs 28). Precoding similarly beamforms signals to be transmitted to the UEs 28 to maximize the reception of a transmitted signal at its target UE 28.

In an exemplary aspect, the antenna array 26 of the radio access node 20 includes a large number of B antennas (e.g., at least B=64 antennas). As described above, for such a large antenna array 26, a conventional matrix-vector-product circuit consumes a large amount of power. Consequently, the finite-alphabet beamforming circuitry (e.g., the finite-alphabet equalizer 22 and/or the finite-alphabet precoder 24) provides more efficient spatial equalization in order to minimize power consumption and semiconductor area (which translate to system costs), while achieving high spectral efficiency.

The finite-alphabet equalizer 22 and the finite-alphabet precoder 24 beamform digital baseband signals based on a wireless channel estimation provided by channel estimator circuitry 34 using matrix-vector products. The matrix-vector products required for spatial equalization and precoding involve multiplications and additions, where the hardware multipliers dominate power and area. The area and delay of a hardware multiplier scales with O(mn) and O(log(max{m, n})), respectively, where m and n are the number of bits of each operand. Therefore, circuit area, delay, and power consumption (which is roughly proportional to circuit area) of a matrix-vector-product engine can be minimized by using a low number of bits to represent both operands.

In this regard, Section I below focuses on application of finite-alphabet equalization to uplink communications using the finite-alphabet equalizer 22. Section II adapts the finite-alphabet equalization approach to downlink communications using the finite-alphabet precoder 24.

Notation

Matrices and column vectors are represented with uppercase and lowercase boldface letters, respectively. The Hermitian transpose and the Frobenius norm of a matrix A are denoted by $A^H$ and $\|A\|_F$, respectively. The real part of a complex-valued matrix A is $\Re\{A\}$ and the imaginary part is $\Im\{A\}$. The M×M identity matrix is denoted by $I_M$. The kth entry and the $\ell_2$-norm of a vector a are $a_k$ and $\|a\|_2$, respectively; the entry-wise complex conjugate is denoted by $a^*$. The kth standard basis vector is represented by $e_k$. The signum function sgn(•) is defined as sgn(a)=+1 for a≥0 and sgn(a)=−1 for a<0 and is applied entry-wise to vectors. $\mathbb{E}_x[\cdot]$ is used to denote expectation with respect to the random vector x. The set $\mathbb{S}_+$ contains all positive semidefinite matrices, and the set $\mathbb{R}_+$ contains all the non-negative real numbers.

I. Finite-Alphabet Equalizer (Uplink)

With continuing reference to FIG. 2, traditional approaches have extensively explored the efficacy of low-resolution data converters 36 (e.g., analog-to-digital converters (ADC) and/or digital-to-analog converters (DAC)) at the antenna array 26 of massive MU-MIMO systems. Depending on the scenario, 3 to 8 bits have been shown to achieve near-optimal spectral efficiency. Such methods reduce the precision of one of the operands (i.e., that of the received vector for uplink communications) in a matrix-vector product. However, the coefficients of the equalization matrix (the other operand) are typically left at relatively high precision (e.g., 10 to 12 bits).

To reduce power consumption and implementation costs of spatial equalization, the finite-alphabet equalizer 22 coarsely quantizes the coefficients of one or more spatial equalization matrices. In contrast to approaches that use low-resolution ADCs to quantize the received vector to be equalized, finite-alphabet equalization coarsely quantizes the entries of the spatial equalization matrix. While this approach appears straightforward, obtaining low-resolution finite-alphabet equalization matrices that achieve high spectral efficiency is a hard problem.

Figure 3:
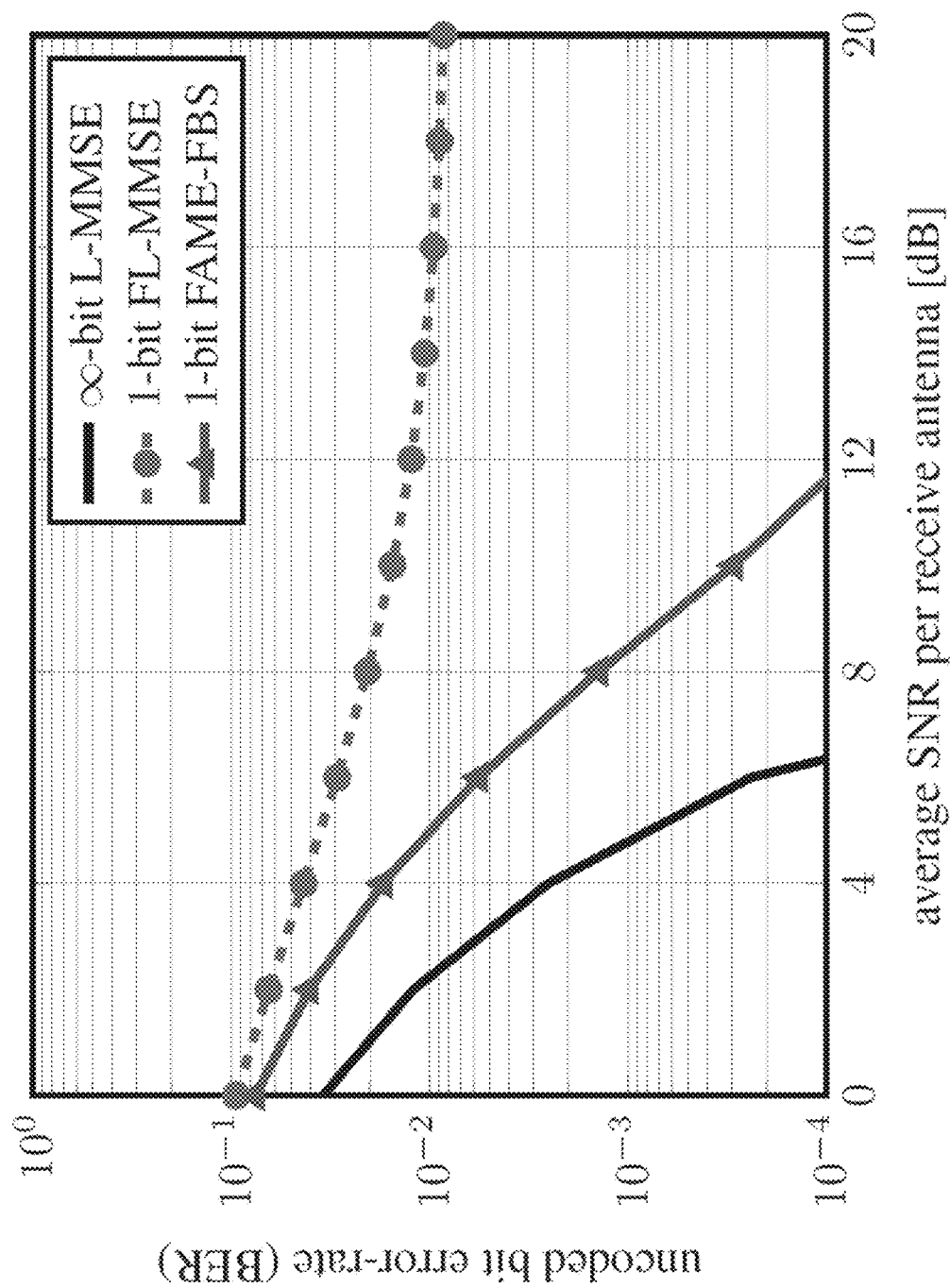
FIG. 3 is a graphical representation of uncoded bit error-rate (BER) for spatial equalization approaches, including the finite-alphabet equalizer of FIG. 2.

FIG. 3 is a graphical representation of uncoded bit error-rate (BER) for spatial equalization approaches, including the finite-alphabet equalizer 22 of FIG. 2. An unquantized linear MMSE (L-MMSE) is compared with a naïve quantization of a 1-bit per real and imaginary part finite-alphabet L-MMSE (FL-MMSE), which suffers from a high error floor. To combat this problem, the finite-alphabet equalizer 22 applies finite-alphabet MMSE equalization (FAME), which leads to an NP-hard optimization problem that can be solved approximately (and efficiently) using forward-backward splitting (FBS). This method is also referred to herein as FAME-FBS. As shown in FIG. 3, using FAME-FBS results in a substantially improved error rate compared to FL-MMSE equalization.

The finite-alphabet equalizer 22 uses a specific finite-alphabet equalization-matrix structure that enables one to reduce the complexity of a U×B matrix-vector product by using U×B low-resolution coefficients, while still being able to deliver a performance similar to conventional, high-resolution spatial equalization matrices, as further described in subsection A below. The so-called FAME problem is described in subsection B below, whose solution leads to finite-alphabet equalization matrices that minimize the post-equalization mean-square error (MSE). In subsection C, a range of algorithms are presented that approximate the NP-hard FAME problem some of these algorithms achieve excellent performance even for 1-bit resolution; some require very low complexity.

In subsection D, the finite-alphabet equalization approach is evaluated for line-of-sight (LoS) and non-LoS mmWave channel models, which demonstrate the efficacy of FAME in terms of error-vector magnitude (EVM), beamforming capabilities, and uncoded BER. In addition, finite-alphabet equalization circuits are implemented for different numbers of bits in a 28 nanometer (nm) complementary metal-oxide-semiconductor (CMOS) to demonstrate the effectiveness of FAME in practice.

A. System Model

With continuing reference to FIG. 2, the U UEs 28 transmit data in the same time-frequency resource to the B antennas in the antenna array 26 of the radio access node 20. After estimating the channel with the channel estimator circuitry 34, the all-digital radio access node 20 applies spatial equalization to collect the signals from the individual UEs 28 and suppress inter-UE interference.

Focusing on the uplink of the wireless communications system 18 (e.g., a massive MU-MIMO system), the following narrowband input-output relation can be defined:

$$y = Hs + n \qquad \text{Equation 1}$$

Here, $y \in \mathbb{C}^B$ is the received signal vector at the radio access node 20, $H \in \mathbb{C}^{B \times U}$ is the known uplink MIMO channel matrix, $s \in \mathcal{S}^U$ is the transmit data vector, where $\mathcal{S}$ is the constellation set (e.g., 16-quadrature amplitude modulation (QAM)), and $n \in \mathbb{C}^B$ is independent and identically distributed (i.i.d.) circularly-symmetric complex Gaussian noise with covariance matrix $C_n = \mathbb{E}_n[nn^H] = N_0 I_B$ per complex entry. In what follows, it is assumed that the transmit signals of the UEs 28, $s_u$, u=1, ..., U, are i.i.d. zero mean with variance $E_s$ so that $C_s = \mathbb{E}_s[ss^H] = E_s I_U$.

It should be understood that the input-output relation in Equation 1 is not only valid to model narrowband transmission, but can also be used to model the subcarriers of a wideband massive MU-MIMO system that uses orthogonal frequency-division multiplexing (OFDM) or single-carrier frequency-division multiple access (SC-FDMA). The theory and algorithms developed in the remainder of this disclosure can be generalized for systems with inter-symbol interference.

For this model, it is assumed that the channel remains constant over multiple symbol transmissions and, hence, can be estimated. For the mathematical derivations, it is further assumed that perfect channel state information is quantized at the radio access node 20. For systems in which the UEs 28 use an antenna array to perform transmit beamforming, the channel matrix H represents the joint effect of beamforming and the physical channel.

A key task of the radio access node 20 is to form estimates $\hat{s} \in \mathbb{C}^U$ of the transmitted data vector s. To develop methods that are computationally efficient and hardware friendly, embodiments focus on linear spatial estimators of the form $\hat{s} = W^H y$, where $W^H \in \mathbb{C}^{U \times B}$ is the L-MMSE equalization matrix that minimizes the post-equalization MSE defined as:

$$MSE = \mathbb{E}_{s,n}[\|W^H y - s\|_2^2] \qquad \text{Equation 2}$$

Given the assumptions on the statistics of the transmit data and noise vectors, s and n:

$$MSE = \mathbb{E}_s \|W^H H - I_U\|_F^2 + N_0 \|W^H\|_F^2 \qquad \text{Equation 3}$$

Hence, the L-MMSE equalization matrix can be obtained by solving the following matrix least-squares problem:

$$W^H = \arg\min_{\tilde{W}^H \in \mathbb{C}^{U \times B}} \|I_U - \tilde{W}^H H\|_F^2 + \rho \|\tilde{W}^H\|_F^2 \qquad \text{Equation 4}$$

with regularization parameter $\rho=N_0/E_s$. This optimization problem has a closed-form solution given by:

$$W^H=(\rho I_U+H_H H)^{-1}H^H \qquad \text{Equation 5}$$

which can be computed efficiently in hardware.

Alternatively, the rows $w_u^H$, $u=1, \ldots, U$, of the L-MMSE equalization matrix $W^H$ can be computed by solving:

$$w_u = \arg\min_{\tilde{w}\in\mathbb{C}^B} \|e_u - H^H\tilde{w}\|_2^2 + \rho\|\tilde{w}\|_2^2 \qquad \text{Equation 6}$$

This alternative formulation of the L-MMSE equalizer is useful in solving the FAME problem, as detailed in the next subsection.

B. FAME: Finite-Alphabet MMSE Equalization

Embodiments of the finite-alphabet equalizer 22 of FIG. 2 operate under the finite-alphabet equalization paradigm described in this subsection. A finite-alphabet equalization matrix is defined that enables efficient hardware for low-cardinality alphabets. Then, the FAME problem is formulated, which computes the finite-alphabet equalization matrix that minimizes the post-equalization MSE. Finally, a simple approach is presented to compute finite-alphabet equalization matrices and compare performance of the finite-alphabet equalizer 22 to an equalizer that solves the FAME problem exactly.

Linear equalization in hardware requires the computation of an inner product $\hat{s}_u = \langle w_u, y \rangle = w_u^H y$ per UE for every received vector y. As described above, executing even such simple computations at the bandwidth offered by mmWave systems can result in excessively large area and high power consumption. To reduce both the area and power consumption, embodiments of the finite-alphabet equalizer 22 reduce the numerical precision of the equalization vectors $w_u$, $u=1, \ldots, U$. In the extreme case where the entries of $w_u$ are quantized using 1-bit per real and imaginary component, an inner-product computation would only require additions and subtractions; this is significantly less costly (in area and power) than using high-precision multipliers.

However, it is obvious that reducing the numerical precision of the equalization vectors $w_u$ will affect the MSE and eventually the error-rate performance. Furthermore, quantization to, e.g., the finite alphabet $\mathcal{X} = \{+1+j, +1-j, -1+j, -1-j\}$, will result in numerical-range issues, meaning that such matrices will not be able to represent large or small entries. To mitigate both of these issues, a principled way to perform equalization is developed with finite-alphabet matrices.

A U×B finite-alphabet equalization matrix is defined as follows:

$$V^H = \text{diag}(\beta')X^H \qquad \text{Equation 7}$$

Here, $\beta\in\mathbb{C}^U$ is a vector that consists of post-equalization scaling factors and $X^H\in\mathcal{X}^{U\times B}$ is an equalization matrix with entries chosen from the finite alphabet $\mathcal{X}$.

Embodiments of the finite-alphabet equalizer 22 use finite alphabets $\mathcal{X}$ of low cardinality and whose elements can be represented using a small number of bits (e.g., 8 bits or less). An example is the 1-bit finite alphabet $\mathcal{X} = \{+1+j, +1-j, -1+j, -1-j\}$, which uses 1-bit per real and imaginary component.

With Equation 7, the equalized received symbol for the uth UE 28 is given by:

$$\hat{s}_u = v_u^H y = \beta^*_u x_u^H y \qquad \text{Equation 8}$$

where $v_u^H\in\mathbb{C}^{1\times B}$ and $x_u^H\in\mathcal{X}^{1\times B}$ are the uth rows of the matrices $V^H$ and $X^H$, respectively. The spatial equalization as in Equation 8 allows for efficient circuit implementations, especially for finite alphabets with low cardinality and regularly spaced elements. For such matrices, the inner product $x_u^H y$ can be implemented using low-resolution multipliers. As $\beta\in\mathbb{C}^U$, the post-equalization scaling operation by the scalar factor $\beta_u$ is performed using high-resolution multipliers. Nonetheless, this operation is executed only once per UE 28. Section I-D below illustrates that equalizer implementations which leverage finite-alphabet equalization matrices enable significant area and power savings.

From the above equations, FAME is developed as a principled method to compute MSE-optimal finite-alphabet equalization matrices. Analogous to the derivation of the L-MMSE equalizer in Equation 6, FAME is interested in minimizing the post-equalization MSE:

$$FA\text{-}MSE = \mathbb{E}_{s,n}[\|V^H y - s\|_2^2] \qquad \text{Equation 9}$$

with the difference that $V^H=\text{diag}(\beta^*)X^H$ is now a finite-alphabet equalization matrix as per Equation 7. From Equation 6, it follows that the rows $v_u^H=\beta^*_u x_u^H$, $u=1, \ldots, U$, of such a FAME matrix can be computed by solving the following optimization problem:

$$\{\beta_u, x_u\} = \arg\min_{\tilde{x}\in\mathcal{X}^B, \tilde{\beta}\in\mathbb{C}} \|e_u - H^H\tilde{\beta}\tilde{x}\|_2^2 + \rho\|\tilde{\beta}\tilde{x}\|_2^2 \qquad \text{Equation 10}$$

Intuitively, embodiments seek to find the finite-alphabet equalization vectors $v_u^H=\beta^*_u x_u^H$, $u=1, \ldots, U$, that best mimic the infinite-precision L-MMSE equalizer.

For a fixed scaling factor $\beta_u$, the FAME problem in Equation 10 is a closest vector problem, which is known to be NP-hard. For example, for a system with an antenna array 26 of B=256 antennas using a 1-bit finite-alphabet equalization matrix, solving the FAME problem using an exhaustive search would require one to evaluate the objective function in Equation 10 more than $10^{154}$ times for each UE 28. Clearly, without low-complexity algorithms, the FAME problem cannot be solved in practical massive MU-MIMO mmWave systems.

Since the FAME problem in Equation 10 minimizes the cost function for two quantities at once, i.e., the scaling factor $\beta_u$ and the low-resolution vector $x_u$, it is not obvious how to solve it efficiently. To derive computationally efficient algorithms in subsection C below, the following equivalent form of the FAME problem is used. The FAME problem in Equation 10 is equivalent to solving the following optimization problem for each UE $u=1, \ldots, U$:

$$x_u = \arg\min_{\tilde{x}\in\mathcal{X}^B} \frac{\|H^H\tilde{x}\|_2^2 + \rho\|\tilde{x}\|_2^2}{|h_u^H\tilde{x}|^2} \qquad \text{Equation 11}$$

where the associated optimal scaling factor is given by:

$$\beta_u(x_u) = \frac{x_u^H h_u}{\|H^H x_u\|_2^2 + \rho\|x_u\|_2^2} \qquad \text{Equation 12}$$

This formulation of the FAME problem facilitates first finding the optimal vector $x_u$ using Equation 11 and then computing the associated optimal scaling factor $\beta_u$ using Equation 12. Note that Equation 12 models the MSE optimal scaling factor $\beta_u$ for a given vector $x_u$, regardless of how $x_u$ was computed.

FL-MMSE: A Baseline Finite-Alphabet Equalizer: Since the FAME problem is NP-hard, a baseline method is presented to compute finite-alphabet equalization matrices as in Equation 7 without having to solve the FAME problem in Equation 11. This approach is referred to as FL-MMSE, as it obtains the entries of the low-resolution matrix $X^H$ by quantizing the L-MMSE equalizer in Equation 5. The corresponding scaling factors $\beta_u$ are then obtained using Equation 12. Throughout this disclosure, the FL-MMSE equalizer is used as a baseline method to evaluate the performance of embodiments of the finite-alphabet equalizer 22 that attempt to directly solve the FAME problem in Equation 11.

For the 1-bit case, FL-MMSE applies the signum function sgn(•) separately on the real and imaginary parts of the L-MMSE matrix $W^H$ to obtain $X^H$. Then, FL-MMSE uses the optimal FAME scaling in Equation 12 to compute the high-resolution scaling factors in the vector β. FL-MMSE can also be used with finite-alphabets that have more than 1-bit per complex entry. In such cases, after computing the L-MMSE equalization matrix $W^H$ in Equation 5, the real and imaginary parts are quantized as follows.

For each row $w_u^H$ of $W^H$, the scalar $w_{max}$ corresponding to the largest absolute value in $[\Re\{w_u^H\}, \Im\{w_u^H\}]$ is identified. Then, assuming that the targeted resolution is r bits, the range $[-w^{max}, +w_{max}]$ is divided into $2^r$ uniform-width bins and the entries of $\Re\{w_u^H\}$ and $\Im\{w_u^H\}$ are quantized to the centroid values of these bins. For 2-bit resolution, for example, the centroid values of the bins are $\{-0.75, -0.25, +0.25, +0.75\}w_{max}$. In hardware, one would scale these centroid values so that the minimum absolute value corresponds to 1. Following the previous example, one would use the values $\{-3, -1, +1, +3\}$ to represent the entries of $\Re\{x_u^H\}$ and $\Im\{x_u^H\}$. Note that this scaling does not affect the solution of the FAME problem in Equation 11, as it can be absorbed into the scaling factor vector $\beta_u$ in Equation 12. After obtaining the low resolution vector, the corresponding scaling factor $\beta_u$ is computed using Equation 12.

FIGS. 4A-4C and 5A-5C illustrate EVM and beamforming performance of the optimal solution to the FAME problem in Equation 11 for a 1-bit finite alphabet. To solve the NP-hard problem, these examples use an exhaustive search, referred to as FAME-EXH, for the finite-alphabet equalizer 22 of FIG. 2. To keep the complexity within reasonable bounds, a small MU-MIMO system with a B=8 antenna array 26 is simulated. For comparison, the performance of conventional, infinite-precision L-MMSE equalization and 1-bit FL-MMSE equalization are simulated.

Figure 4A:
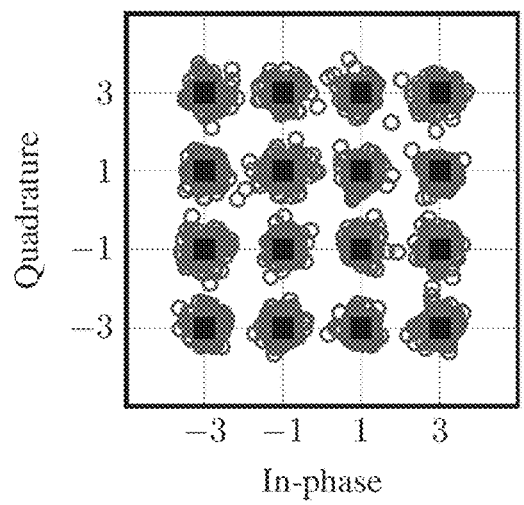
FIG. 4A is a graphical representation of error-vector magnitude (EVM) performance for a linear minimum mean-square error (L-MMSE) equalizer.
Figure 4B:
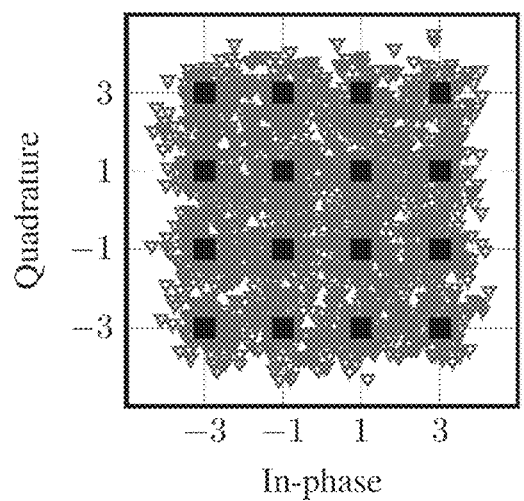
FIG. 4B is a graphical representation of EVM performance for a nave finite-alphabet L-MMSE (FL-MMSE) equalizer.
Figure 4C:
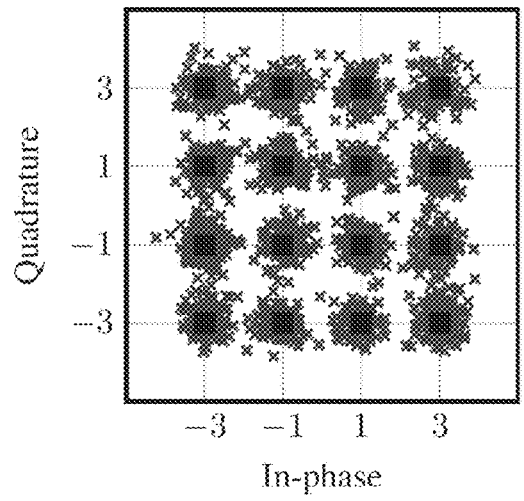
FIG. 4C is a graphical representation of EVM performance for a finite-alphabet MMSE equalization (FAME) using an exhaustive search FAME-EXH embodiment of the finite-alphabet equalizer of FIG. 2.

FIG. 4A is a graphical representation of EVM performance for the L-MMSE equalizer. FIG. 4B is a graphical representation of EVM performance for the nave FL-MMSE equalizer. FIG. 4C is a graphical representation of EVM performance for a FAME-EXH embodiment of the finite-alphabet equalizer 22 of FIG. 2. FIGS. 4A-4C show scatter plots of the equalization outputs § for 2,000 realizations for these embodiments of the wireless communications system 18 operating over an i.i.d. Rayleigh-fading channel at 15 decibels (dB) SNR.

While the infinite-precision L-MMSE equalizer achieves an EVM of 11.58%, quantizing its solution to 1-bit using FL-MMSE degrades the EVM to 30.58%, which blurs the decision regions of the considered 16-QAM constellation. In stark contrast, the 1-bit FAME-EXH equalizer achieves an EVM of only 15.30%, which is close to that of the infinite-precision L-MMSE equalizer; furthermore, the decision regions between constellation points are clearly visible. These results demonstrate the significant EVM advantage of solving the FAME problem over the simple FL-MMSE equalizer.

Figure 5A:
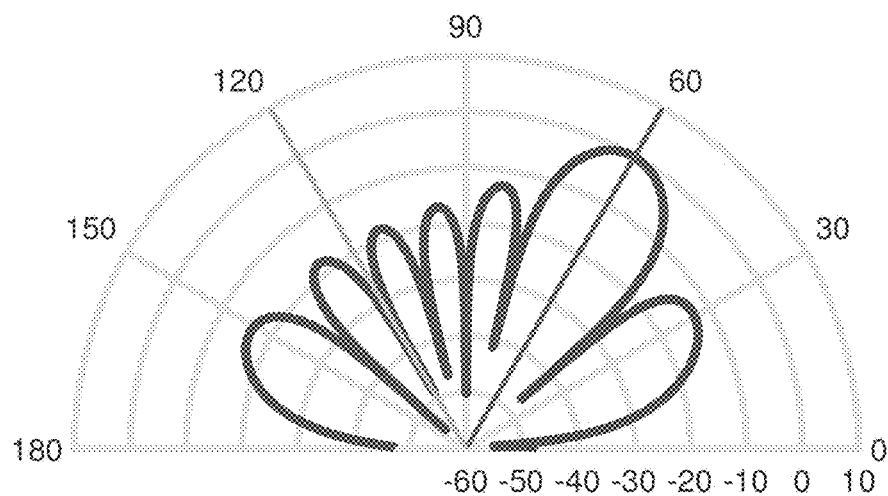
FIG. 5A is a graphical representation of beam- and null-forming capabilities for the L-MMSE equalizer.
Figure 5B:
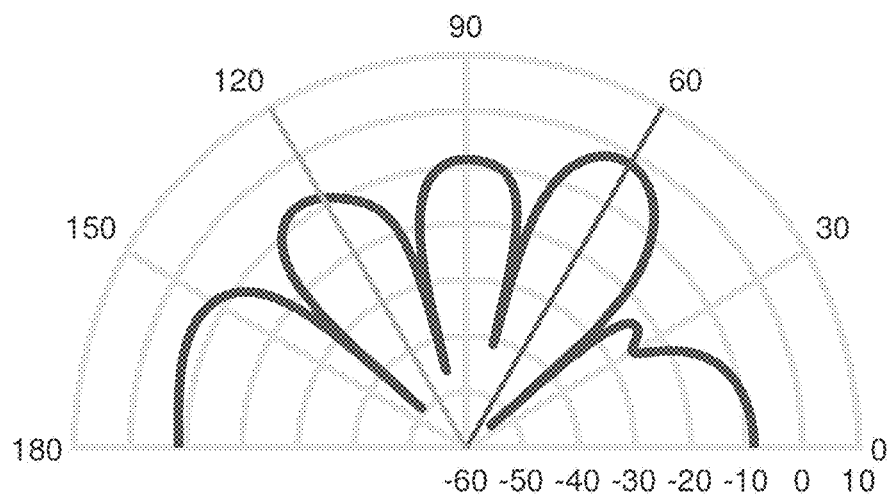
FIG. 5B is a graphical representation of beam- and null-forming capabilities for the FL-MMSE equalizer.
Figure 5C:
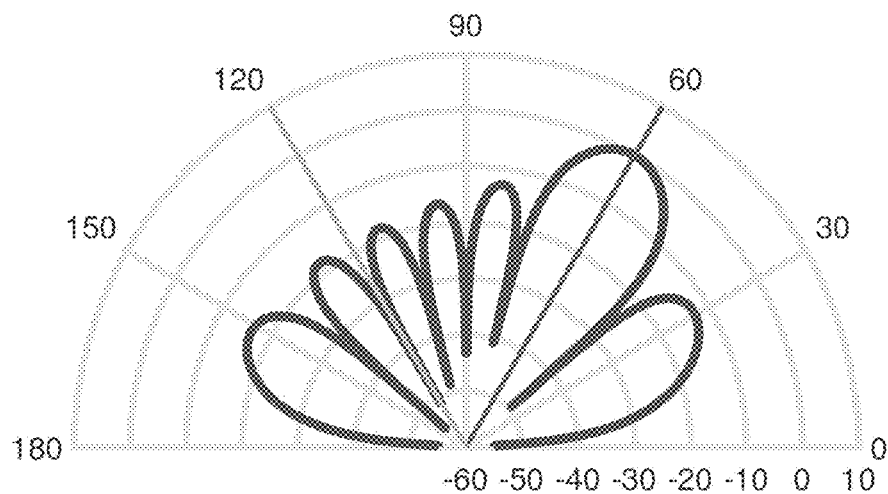
FIG. 5C is a graphical representation of beam- and null-forming capabilities for the FAME-EXH embodiment of the finite-alphabet equalizer of FIG. 2.

FIG. 5A is a graphical representation of beam- and null-forming capabilities for the L-MMSE equalizer. FIG. 5B is a graphical representation of beam- and null-forming capabilities for the FL-MMSE equalizer. FIG. 5C is a graphical representation of beam- and null-forming capabilities for the FAME-EXH embodiment of the finite-alphabet equalizer 22 of FIG. 2. For FIGS. 5A-5C, these embodiments of the wireless communications system 18 operating at 15 dB SNR over a textbook LoS channel were modeled, where the channel coefficient between the bth antenna of the antenna array 26 and a UE 28 located at an angle of φ is modeled as follows:

$$h_b(\phi) = e^{-j\pi(b-1)\cos(\phi)}, b=1,\ldots,B \quad \text{Equation 13}$$

Here, a uniform linear array (ULA) of antennas with half-wavelength antenna spacing and constant path loss is assumed. A primary UE 28 is located at an angle of $\phi_1 = 60°$ and a secondary UE 28 is located at $\phi_2 = 120°$. Next, the corresponding equalization matrix is computed using L-MMSE, FL-MMSE, and FAME-EXH equalization. An evaluation is performed of how much the equalization vector $v_1^H$ (which corresponds to the UE at $\phi_1 = 60°$) captures (or rejects) signals incoming from different incident angles by evaluating $|v_1^H h(\phi')|^2$ for $0 \le \phi' \le \pi$. The equalization vector $v_1^H$ should amplify the signal from the primary UE 28 at $\phi_1 = 60°$ but attenuate the signal from the secondary UE 28.

The results shown in FIGS. 5A-5C demonstrate that the infinite-precision L-MMSE equalization is able to simultaneously beam-form towards the primary UE 28 and null interference from the secondary UE 28. The 1-bit FL-MMSE equalizer is unable to reject interference from the secondary UE 28. In stark contrast, the 1-bit FAME-EXH equalization is able to both beamform towards the primary UE 28 and null-form towards the secondary UE 28.

Despite the significant performance advantages of 1-bit FAME-EXH over 1-bit FL-MMSE, solving 1-bit FAME-EXH for large-dimensional problems that arise in mmWave systems is infeasible in practice. To this end, low-complexity FAME solvers are developed that scale to large antenna arrays 26.

C. Fast Algorithms to Solve FAME

Approximate algorithms are presented to solve the FAME problem efficiently for a radio access node 20 with a large antenna array 26. This begins with proposing a semidefinite relaxation (SDR)-based method and then developing a much faster method that uses forward-backward splitting (FBS).

FAME with SDR: First, SDR is used to solve the FAME problem in Equation 11 for a 1-bit finite alphabet. To do so, the FAME problem is re-expressed in the real domain using the quantities:

$$x_R = \begin{bmatrix} \Re\{x\} \\ \Im\{x\} \end{bmatrix} \text{ and } H_R = \begin{bmatrix} \Re\{x\} & -\Im\{x\} \\ \Im\{x\} & \Re\{x\} \end{bmatrix} \quad \text{Equation 14}$$

Throughout, it is assumed that $\Re\{x\}$ and $\Im\{x\}$ take values from the same alphabet $\mathcal{X}_R$. For example, for 1-bit finite alphabets, $\mathcal{X}_R = \{-1, +1\}$. The FAME problem in Equation 11 can now be rewritten as:

$$x_{R,u} = \arg\min_{\tilde{x}_R \in \mathcal{X}_R^{2B}} \frac{\|H_R^H \tilde{x}_R\|_2^2 + \rho \|\tilde{x}_R\|_2^2}{|h_{R,u}^H \tilde{x}_R|^2} \quad \text{Equation 15}$$

It is now key to realize that the vector $\tilde{x}_\mathbb{R}$ can be scaled arbitrarily without changing the objective function of Equation 15. This observation enables us to state an equivalent optimization problem:

$$\begin{cases} \text{minimize}_{\tilde{x}_\mathbb{R} \in \mathcal{Z}_\alpha^{2B}, \alpha>0} \|H_\mathbb{R}^H \tilde{x}_\mathbb{R}\|_2^2 + \rho\|\tilde{x}_\mathbb{R}\|_2^2 \\ \text{subject to } |h_{\mathbb{R},u}^H \tilde{x}_\mathbb{R}|^2 = 1 \end{cases} \quad \text{Equation 16}$$

where the discrete set $\mathcal{Z}_\alpha$ is a scaled version of $\mathcal{X}_\mathbb{R}$; for 1-bit finite alphabets, $\mathcal{Z}_\alpha = \{-\alpha, +\alpha\}$ with $\alpha>0$. This formulation enables formulation of a semidefinite program to solve the FAME problem approximately.

By focusing on 1-bit finite alphabets, Equation 16 can be relaxed by replacing the constraint $\mathbf{h}_{\mathbb{R},u}^H \tilde{x}_\mathbb{R}|^2 = 1$ by $\mathbf{h}_{\mathbb{R},u}^H \overline{X}_\mathbb{R} = 1$, where the positive semidefinite matrix $\overline{X} \in \mathbb{S}_+^{2B}$ should approximate $\overline{x}_\mathbb{R} \overline{x}_\mathbb{R}^H$. This SDR yields $$\begin{cases} \text{minimize}_{\overline{X} \in \mathbb{S}_+^{2B}} tr((H_\mathbb{R} H_\mathbb{R}^H + \rho I_{2B})\overline{X}) \\ \text{subject to } \quad h_{\mathbb{R},u}^H \overline{X} h_{\mathbb{R},u} = 1 \\ \qquad\qquad\quad X_{1,1} = X_{b,b}, b = 2, \ldots, 2B \end{cases} \quad \text{Equation 17}$$

where the diagonal elements of $\overline{X} \in \mathbb{S}_+^{2B}$ are made equal (without specifying their value). This constraint is a result of the fact that we are interested in a solution in the set $\mathcal{Z}_\alpha$, where the parameter a is not known. After solving the semidefinite program in Equation 17, the finite-alphabet vector is computed by first extracting the leading eigenvector of the solution matrix $\overline{X}$ followed by quantizing it to $\{-1, +1\}$ using the signum function $\text{sgn}(\cdot)$. The equalization vector can then be scaled using the optimal FAME scaling parameter in Equation 12. This procedure is referred to herein as FAME-SDR.

While FAME-SDR can also be derived for multi-bit finite alphabets, this approach is not pursued for the following reasons. As described further below, the complexity of FAME-SDR does not scale well to a large number of BS antennas. Moreover, FAME-SDR cannot be applied to finite alphabets that are not separable into real and imaginary parts, such as a finite alphabet that contains the elements of an 8-phase shift keying (PSK) constellation. In addition, SDR can only handle finite alphabets with even cardinality that exclude a zero element. To avoid the drawbacks of SDR for FAME, an alternative approach is presented.

FAME with FBS: Due to the high complexity of FAME-SDR and the fact that SDR solvers are notoriously difficult to implement in hardware, a low-complexity alternative for solving the FAME problem approximately is presented next. To do so, it is assumed that, for each UE $u=1, \ldots, U$, the optimal value of the objective in Equation 11 is known and denoted by $\gamma_u$. Mathematically:

$$\gamma_u = \frac{\|H^H x_u\|_2^2 + \rho\|x_u\|_2^2}{|h_u^H x_u|^2}, \quad \text{Equation 18}$$

where $x_u$ is the solution to the problem in Equation 11. Note that it follows from Equation 18 that $\gamma_u > 1$. Rearranging 18 yields:

$$0 = \|H^H x_u\|_2^2 + \rho\|x_u\|_2^2 - \gamma_u |h_u^H x_u|^2 \quad \text{Equation 19}$$

Thus, if $\gamma_u$ was known, solving the problem:

$$x_u = \text{argmin}_{\tilde{x} \in \mathcal{X}^B} \frac{1}{2}\|H^H \tilde{x}\|_2^2 + \frac{\rho}{2}\|\tilde{x}\|_2^2 - \frac{\gamma_u}{2}|h_u^H \tilde{x}|^2 \quad \text{Equation 20}$$

would yield the same solution as Equation 11. As the value of $\gamma_u$ is unknown in practice, it is used as an algorithm parameter that is tuned to empirically improve the error-rate performance.

Since the problem in Equation 20 still contains a search over the finite-alphabet $\mathcal{X}^B$, the non-convex constraint $\tilde{x} \in \mathcal{X}^B$ is relaxed to $\tilde{x} \in \mathcal{B}^B$. Here, $\mathcal{B}$ corresponds to the convex hull of the finite alphabet $\mathcal{X}$, which is defined as:

$$\mathcal{B} = \left\{ \sum_{i=1}^{|\mathcal{X}|} \alpha_i \overline{x}_i \,\middle|\, (\alpha_i \in \mathbb{R}_+, \forall i) \wedge \sum_{i=1}^{|\mathcal{X}|} \alpha_i = 1 \right\}, \quad \text{Equation 21}$$

where $\overline{x}_i$ is the ith element of $\mathcal{X}$ and $i=1, \ldots, |\mathcal{X}|$. After this relaxation step, the all-zeros vector $0_{B \times 1}$ becomes a trivial solution. To prevent the algorithm from returning this trivial solution, a term in Equation 20 is included that encourages large entries in the vector x. Specifically, $$-\frac{\delta}{2}\|\tilde{x}\|_2^2$$

is added to the objective function, where $\delta > 0$ is a regularization parameter. The resulting optimization problem is given by:

$$x_u = \text{argmin}_{\tilde{x} \in \mathcal{B}^B} \frac{1}{2}\|H^H \tilde{x}\|_2^2 - \frac{\gamma_u}{2}|h_u^H \tilde{x}|^2 + \frac{\rho - \delta}{2}\|\tilde{x}\|_2^2 \quad \text{Equation 22}$$

FBS is used to compute a solution to Equation 22. FBS is an efficient, iterative solver for convex optimization problems of the form:

$$\hat{x} = \arg\min_{\tilde{x}} f(\tilde{x}) + g(\tilde{x}) \quad \text{Equation 23}$$

where both functions $f$ and $g$ are convex, but $f$ is a smooth function and g is not necessarily smooth or bounded. FBS executes the following operations for $t=1, 2, \ldots, t_{max}$ iterations or until convergence:

$$\tilde{z}^{(t+1)} = \tilde{x}^{(t)} - \Sigma^{(t)} \nabla f(\tilde{x}^{(t)}) \quad \text{Equation 24}$$

$$\tilde{x}^{(t+1)} = \text{prox}_g(\tilde{z}^{(t+1)}; \tau^{(t)}) \quad \text{Equation 25}$$

Here, $\nabla f(\tilde{x}^{(t)})$ is the gradient of the function $f$, $\{\tau^{(t)} > 0\}$ is a sequence of step sizes, and $\text{prox}_g(\cdot)$ is the proximal operator of the function g, defined as:

$$\text{prox}_g(\tilde{z}; \tau) = \text{argmin}_{\tilde{x}} \left\{ \tau g(\tilde{x}) + \frac{1}{2}\|\tilde{x} - \tilde{z}\|_2^2 \right\} \quad \text{Equation 26}$$

The problem in Equation 22 is not convex and hence, FBS is not guaranteed to converge to an optimal solution. Nevertheless, FBS can be used to find approximate solutions to Equation 22 by setting:

$$f(\tilde{x}) = \frac{1}{2}\|H^H\tilde{x}\|_2^2 - \frac{\gamma_u}{2}|h_u^H\tilde{x}|^2 \quad \text{Equation 27}$$

$$g(\tilde{x}) = 1_{\mathcal{B}^B}(\tilde{x}) + \frac{\rho - \delta}{2}\|\tilde{x}\|_2^2 \quad \text{Equation 28}$$

Here, the convex constraint $\tilde{x} \in \mathcal{B}^B$ in Equation 22 is incorporated into the function $g(\tilde{x})$ via the indicator function $1_{\mathcal{B}^B}(\tilde{x})$, which is zero if $\tilde{x} \in \mathcal{B}^B$ and infinity otherwise. With these definitions:

$$\nabla f(\tilde{x}) = HH^H\tilde{x} - \gamma_u h_u h_u^H \tilde{x} \quad \text{Equation 29}$$

$$prox_g(\tilde{z}) = \text{sgn}(\Re\{\tilde{z}\})\min\{v^{(t)}|\Re\{\tilde{z}\}|,1\} + j\,\text{sgn}(\Im\{\tilde{z}\})\min\{v^{(t)}|\Im\{\tilde{z}\}|,1\} \quad \text{Equation 30}$$

where $v^{(t)} = (1 + \tau^{(t)}(\rho - \delta))^{-1}$ and Equation 30 is applied element-wise to the vector $\tilde{z}$.

Note that three sets of algorithm parameters have been introduced: $\{\tau^{(t)}\}$, $\{v^{(t)}\}$, and $\{\gamma_u\}$, where $t = 1, \ldots, t_{max}$ and $u = 1, \ldots, U$. In some examples, these parameters may be tuned manually. To avoid manual tuning of these parameters, other embodiments apply a neural-network-based approach. As the same algorithm parameters should work across several channel realizations, having a per-UE parameter such as $\{\gamma_u\}$ is meaningless. As a result, embodiments set $\gamma = \gamma_u$ for $u = 1, \ldots, U$. Furthermore, to provide the neural network with greater flexibility during optimization, $\gamma$ is allowed to be different in each iteration; i.e., another set of per-iteration parameters $\{\gamma^{(t)}\}$, $t = 1, \ldots, $ tdmax are introduced. The resulting algorithm is referred to as FAME-FBS, which is summarized as follows:

---

Algorithm 1 (FAME-FBS). Initialize $\tilde{x}^{(1)}$ with either the maximum ratio combining (MRC) solution $h_u$ or the low-resolution vector $x_u$ computed by FL-MMSE, and fix the sets of parameters $\{\tau^{(t)}\}$, $\{v^{(t)}\}$, and $\{\gamma^{(t)}\}$. Then, for every iteration $t = 1, \ldots, t_{max}$, compute:
$\tilde{z}^{(t+1)} = (I_B - \tau^{(t)}H(I_U - \gamma^{(t)}e_u e_u^H)H^H)\tilde{x}^{(t)}$    Equation 31
$\tilde{x}^{(t+1)} = prox_g(\tilde{z}^{(t+1)})$    Equation 32
Here, the proximal operator $prox_g(\cdot)$ is the element-wise function given by Equation 30. The result $\tilde{x}^{(t_{max}+1)}$ is quantized to the finite alphabet $\mathcal{X}$ to obtain $x_u^H$. Then, the optimal FAME scaling parameter $\beta_3$ is computed using Equation 12.

---

FAME-FBS supports multi-bit finite alphabet equalization matrices. This is achieved by uniformly quantizing, in the range $[-1, +1]$, the real and imaginary parts of the solution vector $\tilde{x}^{(t_{max}+1)}$, similar to what is done by FL-MMSE equalization. As a consequence, unlike FAME-SDR, FAME-FBS can operate with finite alphabets that contain (i) an odd number of elements and (ii) a zero element. Furthermore, FAME-FBS (and FL-MMSE) can be applied to PSK-like finite alphabets.

Computational Complexity: The complexity is assessed of (i) computing the equalization matrix and (ii) performing equalization on a received vector y, for high-resolution and finite-alphabet equalization approaches. Computational complexity is measured as the number of real-valued multiplications performed by an algorithm.

Table I lists the computational complexity for computing a single equalization matrix using L-MMSE, FL-MMSE, FAME-SDR, and FAME-FBS. For the infinite-precision L-MMSE equalizer, the complexity corresponds to explicitly computing the equalization matrix $W^H$. For the finite-alphabet equalizers (FL-MMSE and FAME-based algorithms), the complexity corresponds to the computation of the low-resolution matrix $X^H$ and the scaling factors in the vector $p$. Solving FAME-SDR results in the highest complexity, which asymptotically scales as $O(B^{4.5})$ unless specific problem structures can be exploited. Evidently, FAME-SDR does not scale well to systems with a large antenna array 26. FAME-FBS has the same asymptotic scaling of $O(BU^2)$ as L-MMSE and FL-MMSE equalization, making it suitable for massive MU-MIMO mmWave systems.

TABLE I

Complexity for computing an equalization matrix

| Algorithm | Computational complexity | Asymptotic scaling |
|---|---|---|
| L-MMSE | $2U^3 + 6BU^2 - 2BU - 2U + 1$ | $O(BU^2)$ |
| FL-MMSE | $10BU^2 + 2U^3 + 2U^2 + U + 1$ | $O(BU^2)$ |
| FAME-SDR | n.a. | $O(BU^{4.5})$ |
| FAME-FBS | $(8t_{max} + 4)BU^2 + 2U^2 + (4t_{max} + 2)U + (2t_{max} + 3)U$ | $O(BU^2)$ |

While the constant associated with the term $BU^2$ is larger for FAME-FBS than for L-MMSE and FL-MMSE, the complexity of the latter algorithms appears to be higher in practice. Computing the L-MMSE (and the FL-MMSE) equalizer in hardware requires square roots and divisions, which result in high numerical precision requirements. Furthermore, the Cholesky decomposition and forward- and back-substitution procedures required when computing the L-MMSE (and the FL-MMSE) equalization matrix result in stringent data dependencies that limit parallelism and, hence, reduce throughput. In contrast, FAME-FBS has a regular structure with few data dependencies and the matrix-vector multiplications can be parallelized easily. In addition, one can parallelize computation per UE as the FAME problem in Equation 11 is independent for $u = 1, \ldots, U$. In fact, a simple hardware engine could be used to efficiently execute FAME-FBS to determine the low-resolution equalization vectors $x_u^H$.

After computing the equalization matrix, one must perform spatial equalization on the received signal vectors y at the rate of the ADCs. For the infinite-precision L-MMSE equalizer, this corresponds to computing one high-resolution matrix-vector product $\hat{x} = W^H y$ per receive vector. For finite-alphabet equalizers, this corresponds to a low-resolution matrix-vector product $z = X^H y$, followed by U high-resolution products $\hat{s}_u = \beta^*_u z_u$, $u = 1, \ldots, U$. The complexity of equalization is summarized in Table II, which distinguishes between high resolution and low resolution multiplications. While finite-alphabet equalization performs more multiplications than a conventional equalizer, most of these multiplications are performed at low resolution. Thus, for sufficiently low resolution, finite-alphabet equalization effectively reduces the complexity of spatial equalization.

TABLE II

Complexity of finite-alphabet equalization

| | Real-valued multiplication count | |
|---|---|---|
| Equalization | High resolution | Low resolution |
| Traditional | 4BU | 0 |
| Finite Alphabet | 4U | 4BU |

While spatial equalization must be carried out at symbol rate, the computation of the equalization matrix must only be carried out if the channel matrix changes. Due to operation at extremely high bandwidths, the complexity of performing equalization will dominate in most mmWave systems. For scenarios with short coherence times, methods that minimize the complexity of computing the equalization matrix are to be preferred.

D. Evaluation

With reference to FIGS. 6A-6B and 7A-7B, the uncoded BER performance of FAME-based algorithms are evaluated and compared to infinite-precision L-MMSE equalization and FL-MMSE. The following simulation results are obtained by carrying out $10^4$ Monte-Carlo trials. The per-iteration parameters $\{\gamma^{(t)}\}$, $\{\tau^{(t)}\}$, and $\{v^{(t)}\}$ of FAME-FBS are tuned using a neural network; the neural network is trained using $10^4$ channel realizations, which differ from the ones used to evaluate the BER. For all equalizers, the entries of the channel matrices H are quantized to 8 bits per real and imaginary components. In addition, the received signal vectors are quantized to 7 bits per real and imaginary components, which is sufficient to achieve virtually the same performance as with double-precision representation.

Figure 6A:
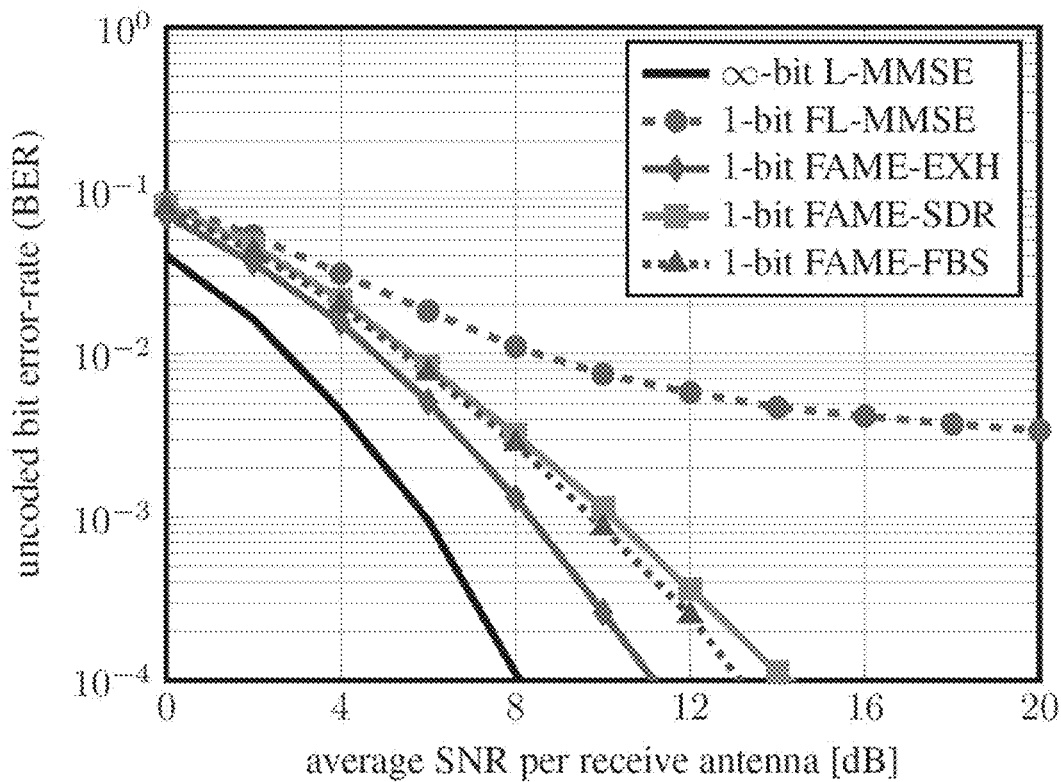
FIG. 6A is a graphical representation of uncoded BER for an 8 antenna, 2 UE scenario using quadrature phase-shift keying (QPSK) in an independent and identically distributed (i.i.d.) Rayleigh-fading scenario under various equalization approaches.

FIG. 6A is a graphical representation of uncoded BER for an 8 antenna, 2 UE scenario using quadrature phase-shift keying (QPSK) in an i.i.d. Rayleigh-fading scenario under various equalization approaches. For this example, 1-bit FAME-EXH significantly outperforms 1-bit FL-MMSE, which suffers from an error floor. Since the complexity of FAME-EXH scales exponentially in B, it cannot be used for significantly larger systems. Hence the performance of FAME-SDR is shown, with a 2 dB loss at a BER of $10^{-3}$ compared to FAME-EXH.

Figure 6B:
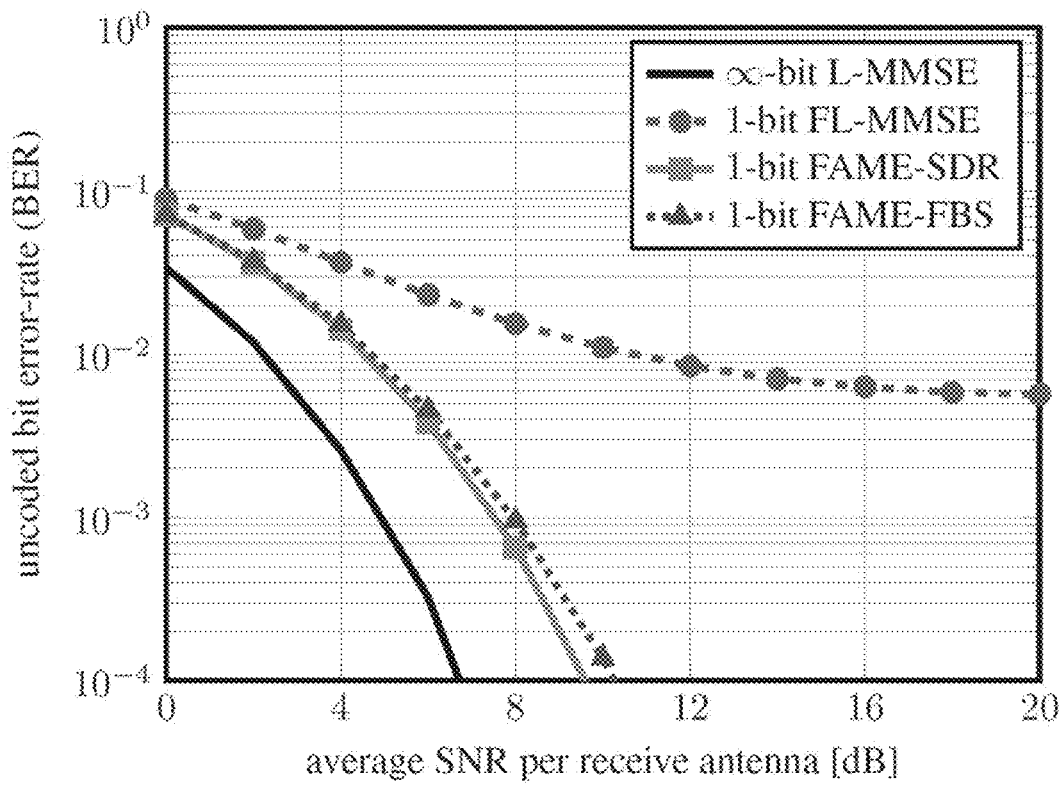
FIG. 6B is a graphical representation of uncoded BER for a 64 antenna, 4 UE scenario using 16-quadrature amplitude modulation (QAM) in an i.i.d. Rayleigh-fading scenario under various equalization approaches.

FIG. 6B is a graphical representation of uncoded BER for a 64 antenna, 4 UE scenario using 16-QAM in an i.i.d. Rayleigh-fading scenario under various equalization approaches. Since FAME-SDR scales to systems with more BS antennas, this example shows that FAME-SDR continues to substantially outperform 1-bit FL-MMSE. As discussed above, however, FAME-SDR does not scale to systems with more BS antennas, whereas FAME-FBS exhibits the same asymptotic complexity scaling as L-MMSE and FL-MMSE equalization. FIG. 6B illustrates that FAME-FBS performs on par with FAME-SDR at much lower complexity.

Figure 7A:
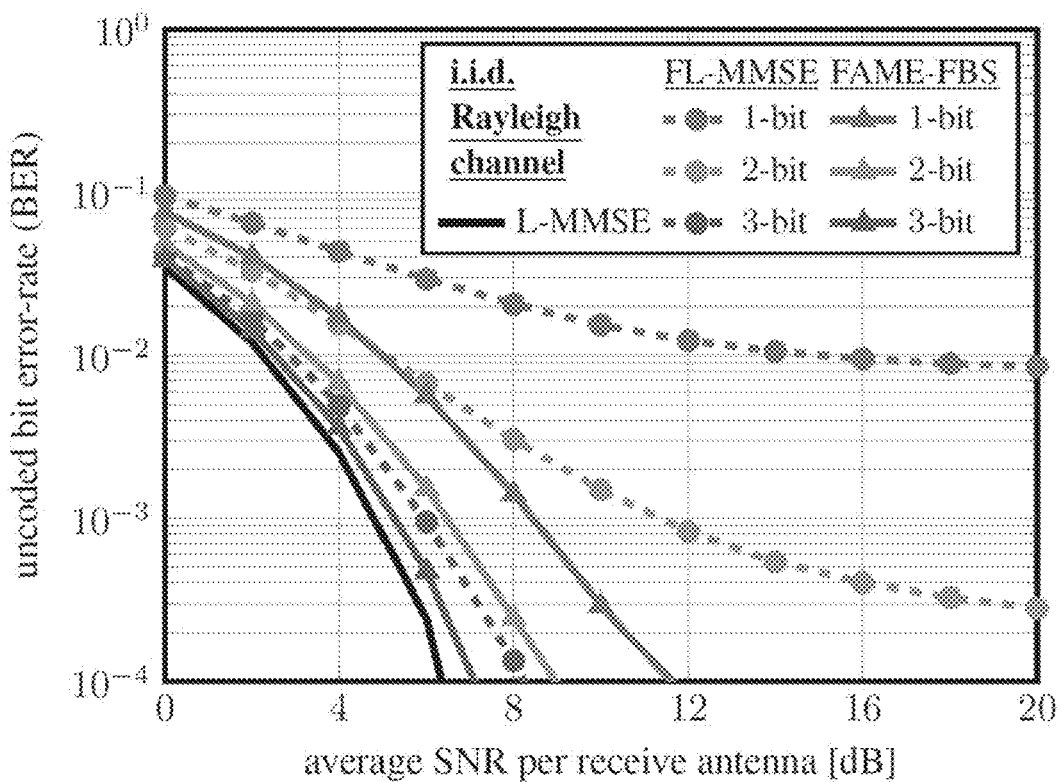
FIG. 7A is a graphical representation of uncoded BER for a 256 antenna, 16 UE scenario using 16-QAM and an i.i.d. Rayleigh-fading channel model under various equalization approaches.

FIG. 7A is a graphical representation of uncoded BER for a 256 antenna, 16 UE scenario using 16-QAM and an i.i.d. Rayleigh-fading channel model under various equalization approaches. The performance behavior of 1-bit FL-MMSE and 1-bit FAME-FBS is similar to what was observed for smaller systems. FIG. 7A also shows the performance of finite-alphabet matrices with resolutions larger than 1 bit. In this regard, the performance gap between FAME-FBS and FL-MMSE is more pronounced for 1-bit and 2-bit finite-alphabet equalization matrices than for 3-bit. Note that finite-alphabet equalizers achieve virtually the same performance as infinite-precision L-MMSE equalization when using 6 bits; nonetheless, 3 bits are sufficient to operate at SNRs lower than 4 dB.

Figure 7B:
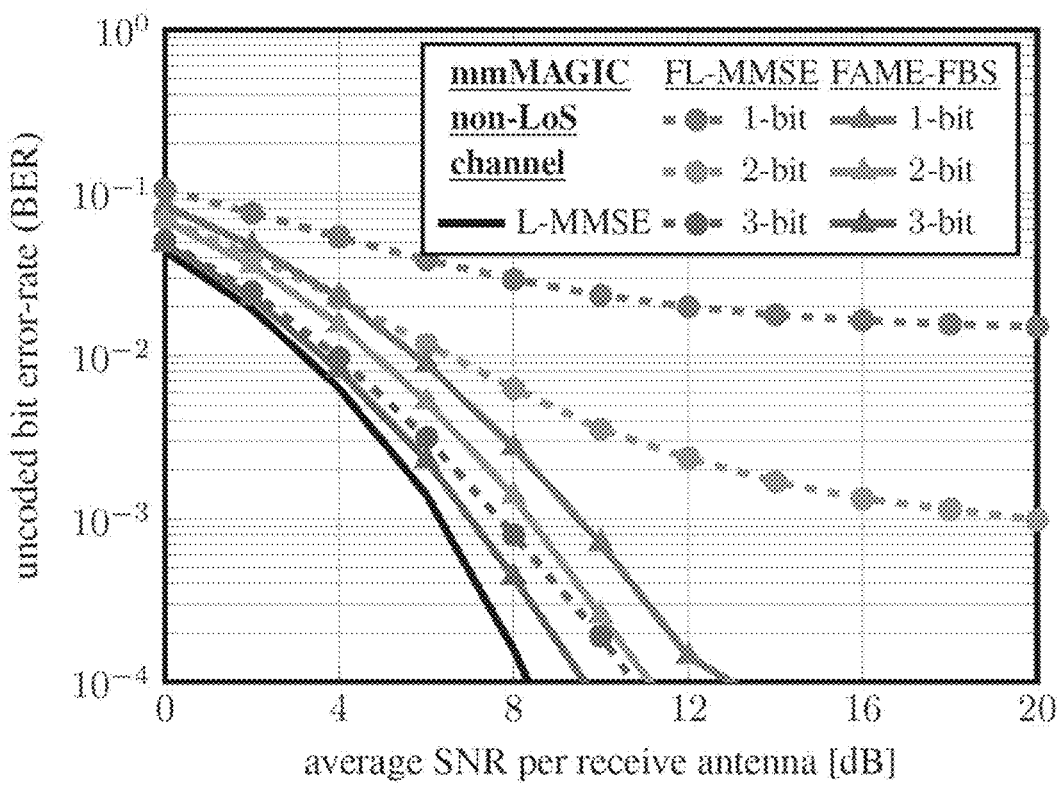
FIG. 7B is a graphical representation of uncoded BER for a 256 antenna, 16 UE scenario using 16-QAM and a non-line of sight (LoS) QuaDRiGa millimeter-wave (mmWave) channel model under various equalization approaches.

FIG. 7B is a graphical representation of uncoded BER for a 256 antenna, 16 UE scenario using 16-QAM and a non-LoS QuaDRiGa mmWave channel model under various equalization approaches. Since i.i.d. Rayleigh-fading channels are a poor model for mmWave propagation conditions, FIG. 7B shows the performance of FAME-FBS operating over more realistic mmWave channels generated using the QuaDRiGa mmWave model (see S. Jaeckel, L. Raschkowski, K. Börner, and L. Thiele, "QuaDRiGa: A 3-D multi-cell channel model with time evolution for enabling virtual field trials," IEEE Trans. Antennas Propag., vol. 62, no. 6, pp. 3242-3256, June 2014). In this example, mmWave systems are simulated with a carrier frequency of 60 GHz within the "mmMAGIC_UMi" scenario of QuaDRiGa.

FIG. 7C is a graphical representation of uncoded BER for a 256 antenna, 16 UE scenario using 16-QAM and an LoS QuaDRiGa mmWave channel model under various equalization approaches. This example is simulated in a similar manner as FIG. 7B, under LoS rather than non-LoS propagation conditions.

Power control is simulated for FIGS. 7B and 7C by ensuring that the received UE powers are in the range ±3 dB. Specifically, for each channel realization, the UE with highest power has 4×the power of the UE with the lowest power. Furthermore, the UEs are randomly placed in a sector of 120° in front of the BS antenna array with a distance ranging from 10 meters (m) to 110 m, and a minimum angular separation of 4°. From FIGS. 7B and 7C it is observed that FAME-FBS outperforms FL-MMSE for both non-LoS and LoS channels essentially the same trends as for Rayleigh-fading channels. These simulation results are a clear indicator that FAME still performs well under more realistic mmWave propagation conditions, while having the potential to significantly reduce power consumption and silicon area.

Hardware-Level Evaluation: To demonstrate the real-world benefits of finite-alphabet equalization, the power and area savings that can be attained in comparison with conventional, high-resolution equalizers are quantified. To arrive at a fair comparison between finite-alphabet equalization and conventional, high-resolution equalizers, two equalization circuits were implemented: one for finite-alphabet equalization and one for high-resolution equalization.

The high-resolution equalizer computes a matrix-vector product between the U×B equalization matrix $W^H$ and the received vector y. The matrix-vector product is computed in a column-by-column fashion by using a linear array of U parallel multiply-accumulate (MAC) units over B clock cycles. The multipliers in the MAC units are high-resolution and take as input 10-bit numbers from the equalization matrix $W^H$ and 7-bit numbers from the received vector y. The accumulators in the MAC units use 18 bits. Finally, 9 bits are taken from both real and imaginary accumulators as the outputs of each MAC unit. These outputs correspond to the estimates $\hat{s}=W^H y$.

The finite-alphabet equalizer computes a low-resolution matrix-vector product between the U×B finite-alphabet matrix XgH and the received vector y. This matrix-vector product is implemented in the same way as in the traditional equalizer, with the difference that far fewer bits are used for the multipliers and accumulators. The multipliers take as input r-bit numbers from $X^H$ and 7-bit numbers from y, while the accumulators use r+13 bits (except for the case where r=1, where the accumulators use 13 bits). 9 bits are taken from the accumulators in each MAC unit as the output of the low-resolution matrix-vector product $X^H y$. Unlike conventional equalization, the results of the U-dimensional vector $X^H y$ are scaled by the values in β. This scaling operation is implemented with a high-resolution multiplier that computes the product between the 9-bit $x_u^H y$ and the 10-bit scaling factor $\beta_u$. The output of this multiplier are the estimates $\hat{s}=V^H y$, which are represented with 9 bits per real and imaginary components.

Table III lists post-layout implementation results for the circuits discussed above implemented for a B=256 BS antenna, U=16 UE system, using a 28 nm CMOS technology. The traditional, high-resolution equalizer corresponds to the design with an equalization resolution r of 10 bits, whereas the finite-alphabet equalizer was implemented for r={1, 2, . . . , 5} bits. To allow for a fair comparison between the different equalization circuits, we consider a scenario in which all of the designs support the same throughput. A throughput of 2 G (complex-valued) vectors/s is assumed, which implies that the 2B ADCs at the BS run at 2 G samples/s.

TABLE III

Implementation results in 28 nm CMOS for one equalizer instance operating in a system with B = 256 and U = 16

| Equalization resolution r [bit] | 1 | 2 | 3 | 4 | 5 | 10 |
|---|---|---|---|---|---|---|
| Silicon area [mm²] | 0.06 | 0.08 | 0.10 | 0.14 | 0.16 | 0.26 |
| Clock freq. [GHz] | 1.33 | 1.25 | 1.25 | 1.16 | 1.16 | 1.05 |
| Throughput [M vectors/s] | 5.18 | 4.88 | 4.88 | 4.53 | 4.53 | 4.10 |
| Power [mW] | 18.5 | 29.2 | 38.8 | 42.6 | 51.3 | 57.1 |

As seen from Table III, a single instance of the equalizer design reaches throughputs of the order of M vectors/s, which is well below the target throughput of 2 G vectors/s. However, a time-multiplexed array of equalizers can be instantiated that achieve the desired throughput (at the expense of increased area).

FIG. 8A is a graphical representation of power as a function of equalizer resolution for a finite-alphabet equalizer 22 hardware designed in 28 nm CMOS technology for a 256 antenna, 16 UE 28 massive MU-MIMO embodiment of the wireless communication system 18 of FIG. 2. FIG. 8B is a graphical representation of area as a function of equalizer resolution for the finite-alphabet equalizer 22 hardware of FIG. 8A. Assuming no overhead for this replication approach, the total silicon area and power consumption required to perform equalization are estimated in a high-bandwidth mmWave setting.

In the example of FIGS. 8A and 8B, all equalizers operate at a rate of 2 G vectors/s and 7 bits are used to represent the entries of the received vector y. For an equalizer resolution lower than 6, a finite-alphabet equalizer consisting of a low-resolution matrix-vector product is used, followed by per-UE high-resolution scaling. The equalizer resolution of 10-bit is executed with a high-resolution matrix-vector product. Finite-alphabet equalization (shown at 1-, 2-, 3-, 4-, and 5-bit) can reduce the power and area of conventional, high-precision equalization (shown at 10-bit). For example, halving the number of bits used for the high-resolution equalizer already introduces substantial gains of 20% and 44% lower power and area, respectively. Further reducing the equalizer resolution reduces the power and area by a factor of 3.9× and 5.8×, respectively, when a 1-bit finite-alphabet equalizer is used.

Note that the power and area can be reduced much more. Once the number of bits in the equalization matrix has been reduced to 5 bits or below, emerging processing-in-memory architectures lower the area and power (additionally to the savings above) by about 2× to 4×.

E. Soft-Output Finite-Alphabet Equalization

In some embodiments, the finite-alphabet equalization approach described above is extended by unbiased estimation and soft-output computation. A compact expression of the post-equalization MSE is derived, which can be used to efficiently compute log-likelihood ratio (LLR) values. The effectiveness of this extension is demonstrated by error-rate simulation results for a coded massive MU-MIMO-OFDM system, for two unbiased soft-output finite-alphabet equalizers, both in LoS and non-LoS mmWave channel scenarios.

This subsection focuses on a massive MU-MIMO embodiment of the wireless communications system 18 of FIG. 2 where U UEs 28 transmit data to a radio access node 20 with an antenna array 26 having B antennas. A central task of the radio access node 20 is to generate estimates of the transmitted data vector s using the received vector y and knowledge of the channel matrix H. At the high bandwidths offered by mmWave systems, linear estimators are preferable due to their simplicity. This subsection therefore focuses on linear spatial equalizers that compute estimates $\bar{s}$ of the transmit signals s as $\bar{s}=W^H y$. Here, $W^H \in \mathbb{C}^{U \times B}$ is a L-MMSE equalization matrix, which minimizes the MSE defined by:

$$MSE = \mathbb{E}_{s,n}[\|\bar{s}-s\|_2^2] \qquad \text{Equation 33}$$

Under the statistical assumptions on s and n of Section I-A above, the L-MMSE equalization matrix is given by:

$$W^H = (\rho I_U + H^H H)^{-1} H^H \qquad \text{Equation 34}$$

where $\rho = N_0/E_S$. The rows $w_u^H$, $u=1, \ldots, U$, of the L-MMSE equalizer $W^H$ can be computed by solving:

$$w_u = \arg\min_{\tilde{w} \in \mathbb{C}^B} \|e_u - H^H \tilde{w}\|_2^2 + \rho\|\tilde{w}\|_2^2 \qquad \text{Equation 35}$$

Spatial equalization with a biased L-MMSE estimate for each user $u=1, \ldots, U$ amounts to computing:

$$\bar{s}_u = w_u^H y = w_u^H h_u s_u + w_u^H \tilde{n}_u \qquad \text{Equation 36}$$

where $h_u$ is the uth column of H and $$\tilde{n}_u = \sum_{i=1, i \neq u}^{U} h_i s_i + n$$

is the noise-plus-interference (NPI) vector. In general, the L-MMSE equalizer has rows for which $w_u^H h_u \neq 1$. Thus, to perform unbiased estimation, the goal is to compute the estimates for each UE $u=1, \ldots, U$ as follows:

$$\hat{s}_u = \frac{\bar{s}_u}{w_u^H h_u} = \frac{w_u^H y}{w_u^H h_u} = s_u + \frac{w_u^H \tilde{n}_u}{w_u^H h_u} \qquad \text{Equation 37}$$

In general, the biased $\bar{s}_u$ and unbiased $\hat{s}_u$ estimates differ: biased estimates minimize the MSE in Equation 33, whereas unbiased estimates typically achieve lower error rates.

While the discussion of subsections A-C above focus on hard-output data detection, coded communication systems benefit from spatial equalizers that compute soft-outputs. To fully exploit forward error correction, the post-equalization NPI variance is extracted and then used to generate LLR values. For the uth UE, the NPI variance is given by the MSE of the unbiased estimate $\hat{s}_u$, which is computed as follows:

$$v_u^2 = \mathbb{E}_{s,n} |\hat{s}_u - s_u|^2 \qquad \text{Equation 38}$$

$$\overset{(a)}{=} \frac{\mathbb{E}_{s,n}\left[|x_u^H H(I_U - e_u e_u^H)s + x_u^H n|^2\right]}{|x_u^H h_u|^2} \qquad \text{Equation 39}$$

$$= \frac{E_s(\|H^H x_u\|_2^2 - |x_u^H h_u^H|^2) + N_0 \|x_u\|_2^2}{|x_u^H h_u|^2} \quad \text{Equation 40}$$

$$= \frac{E_s}{h_u^H x_u} \frac{\|H^H x_u\|_2^2 + \rho \|x_u\|_2^2}{x_u^H h_u} - E_s \quad \text{Equation 41}$$

$$\overset{(b)}{=} E_s\big((\beta_u(x_u) h_u^H x_u)^{-1} - 1\big) \quad \text{Equation 42}$$

Here, (a) follows from Equation 37 and (b) from Equation 12. Note that this result applies to any finite-alphabet equalizer as in Equation 7, as long as $\beta_u(x_u)$ is computed as in Equation 12.

With this, soft outputs can be computed in the form of LLR values, by assuming that the residual error $\hat{s}_u - s_u$ is circularly-symmetric Gaussian with variance $v_u^2$. Concretely, the LLR values are computed as follows:

$$\Lambda_{u,q} = \log\left(\sum_{s \in S_q^{(1)}} \exp\left(-\frac{|\hat{s}_u - s_u|^2}{v_u^2}\right)\right) - \log\left(\sum_{s \in S_q^{(0)}} \exp\left(-\frac{|\hat{s}_u - s_u|^2}{v_u^2}\right)\right) \quad \text{Equation 43}$$

Here, $S_q^{(1)}$ and $S_q^{(0)}$ are the subsets of the constellation $S$ in which the qth bit is 1 and 0, respectively. Note that computing soft outputs for finite-alphabet equalizers entails the same complexity as for infinite-precision L-MMSE.

The FL-MMSE and FAME-FBS algorithms described above can be used to obtain the rows $x_u^H$ of $X^H$. For both algorithms, once $x_u^H$ is known, the associated $\beta_u(x_u)$ is computed using Equation 12; this factor is required to compute the variance $v_u^2$ using Equation 42, which is then used to compute LLR values with Equation 43.

Figure 9A:
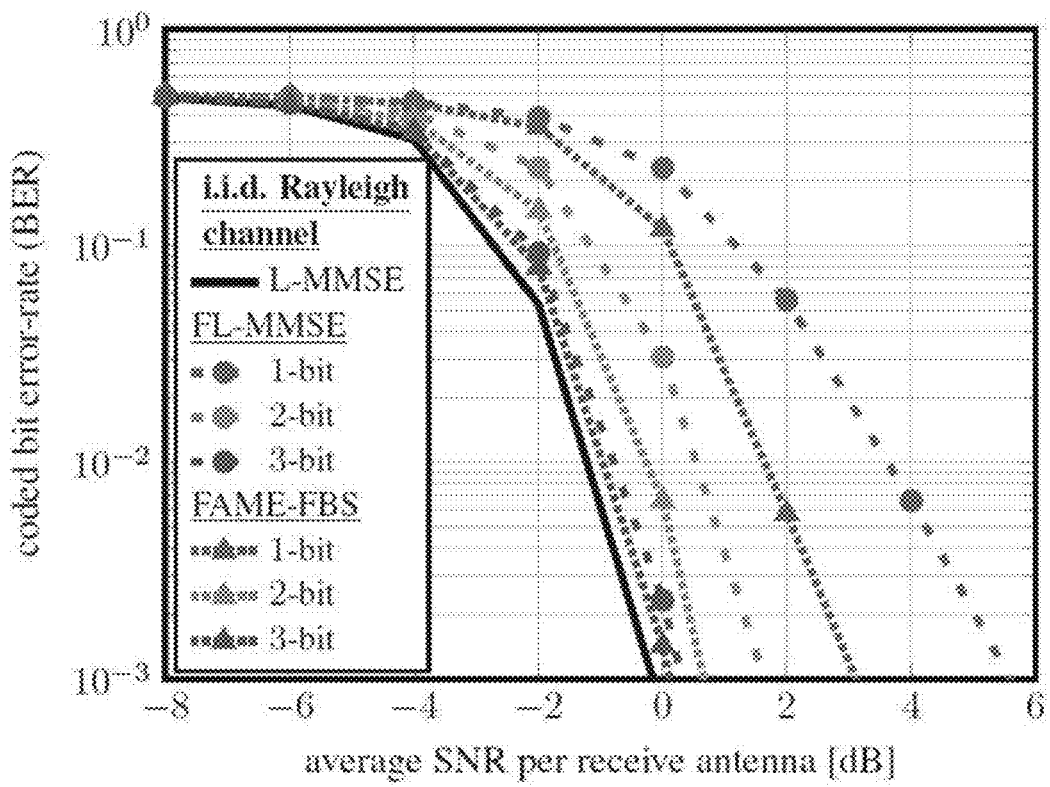
FIG. 9A is a graphical representation of ¾ coded BER for soft-output finite-alphabet equalization using an i.i.d. Rayleigh-fading channel model under various equalization approaches.
Figure 9B:
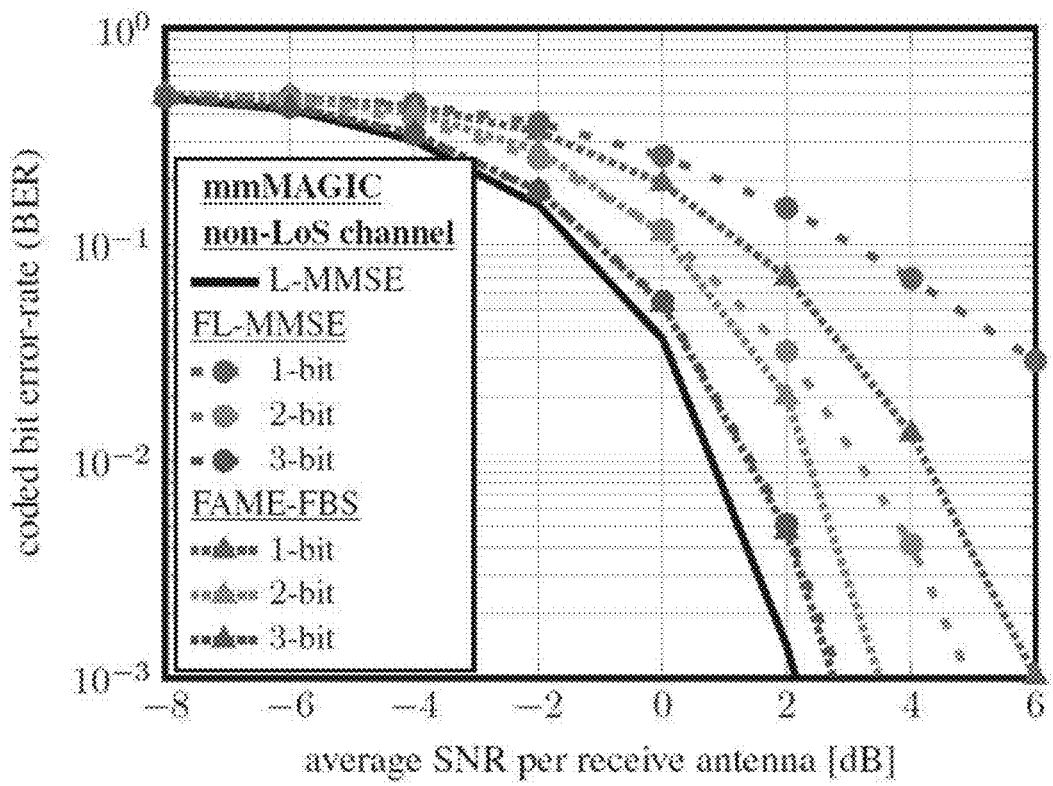
FIG. 9B is a graphical representation of ¾ coded BER for soft-output finite-alphabet equalization using a non-LoS QuaDRiGa mmWave channel model under various equalization approaches.
Figure 9C:
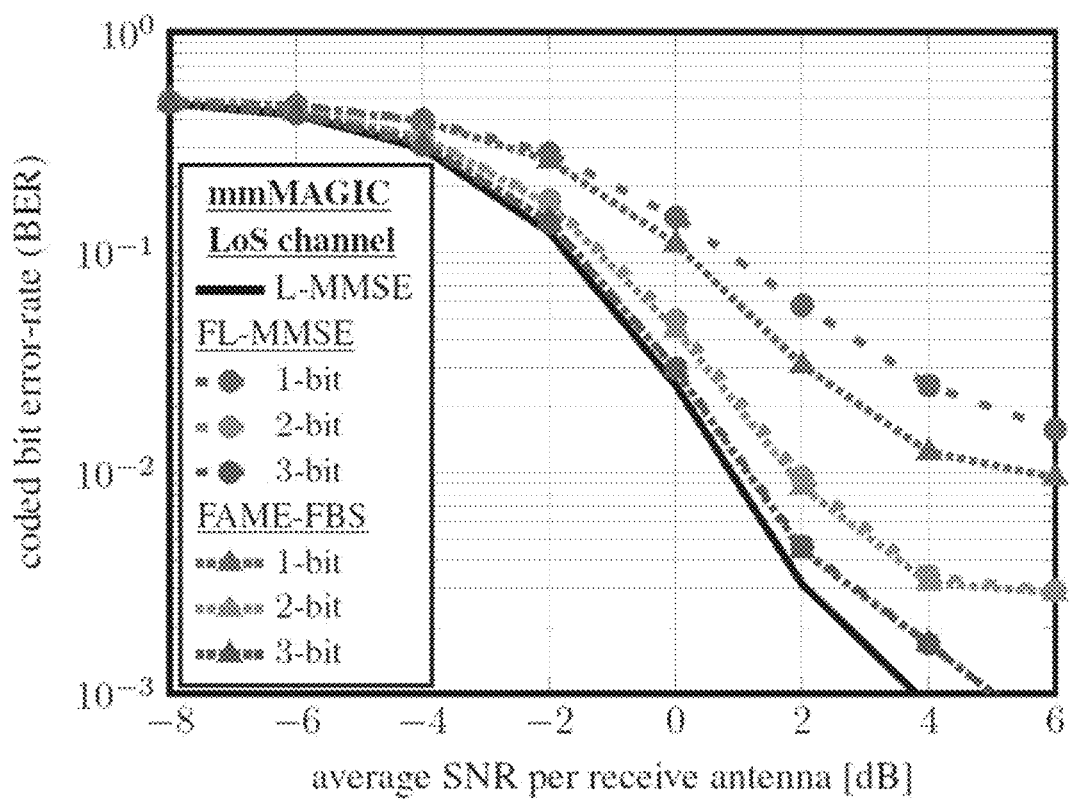
FIG. 9C is a graphical representation of ¾ coded BER for soft-output finite-alphabet equalization using an LoS QuaDRiGa mmWave channel model under various equalization approaches.

FIGS. 9A-9C show coded BER for FL-MMSE and FAME-FBS using 1 to 3 bits per real and imaginary part for each entry of the low-resolution equalization matrix $X^H$. The simulation results correspond to a B=256 antenna array 26, U=16 UEs 28, in a 16-QAM system with OFDM transmission over W=1200 subcarriers. Per-UE rate-¾ convolutional codes and soft-input Viterbi decoding are used as well.

FIG. 9A is a graphical representation of ¾ coded BER for soft-output finite-alphabet equalization using an i.i.d. Rayleigh-fading channel model under various equalization approaches. FIG. 9B is a graphical representation of ¾ coded BER for soft-output finite-alphabet equalization using a non-LoS QuaDRiGa mmWave channel model under various equalization approaches. FIG. 9C is a graphical representation of ¾ coded BER for soft-output finite-alphabet equalization using an LoS QuaDRiGa mmWave channel model under various equalization approaches. These figures illustrate that the coded BER performance of FAME-FBS meets or exceeds that of FL-MMSE for all of the considered scenarios. The discrepancy between these two methods decreases when increasing the number of bits used for the finite-alphabet equalization matrix. While with 1-bit, FAME-FBS offers more than 10× lower BER at 6 dB SNR compared to FL-MMSE for the non-LoS channel, the performance of the 3-bit FL-MMSE and FAME-FBS is practically the same and approaches that of the infinite-precision L-MMSE by less than 1.5 dB for all considered scenarios.

II. Finite-Alphabet Precoder (Downlink)

Similar to the case of equalization in the uplink, the power consumption and silicon area of precoding in the all-digital mmWave MU-MIMO downlink (e.g., from the core network 30 to the UEs 28 of FIG. 2) is expected to be a major bottleneck, as high-dimensional data has to be processed at extremely high rates. In order to reduce power consumption and silicon area of the precoding operation, in some embodiments the concept of finite-alphabet matrices used for linear spatial equalization is applied to linear precoding. Two finite-alphabet precoding schemes are proposed to compute Wiener filter (WF)-optimal matrices, which are matrices that best mimic the linear WF precoder. To demonstrate the effectiveness of this framework, referred to herein as FAWP, its performance is evaluated in terms of uncoded BER and EVM for i.i.d. Rayleigh-fading, and for LoS and non-LoS mmWave channels.

A. System Model

A model is presented which focuses on the downlink of a mmWave massive MU-MIMO embodiment of the wireless communications system 18 of FIG. 2 in which a radio access node 20 with an antenna array 26 having B antennas serves U<B single-antenna UEs 28 in the same time-frequency resource. A narrowband scenario is considered and modeled by y=Hx+n, where y$\in \mathbb{C}^U$ is the received vector, H$\in \mathbb{C}^{U \times B}$ is the channel matrix (e.g., received channel matrix, which may include multiple received channel matrices), x$\in \mathbb{C}^B$ is the precoded vector, and n$\in \mathbb{C}^U$ is i.i.d. circularly-symmetric complex Gaussian noise with variance $N_0$ per complex entry. It is assumed that the channel matrix H is perfectly known to the radio access node 20, and that the precoded vector x is subject to the following average power constraint:

$$\mathbb{E}_x[\|x\|_2^2] \leq P \quad \text{Equation 44}$$

The goal of precoding is to simultaneously transmit constellation points $s_u \in \mathcal{O}$ to the u=1, ..., U UEs while reducing MU interference. Here, $s_u$ is assumed to have zero mean and variance $E_s$, and $\mathcal{O}$ denotes the constellation set (e.g., 16-QAM). The radio access node 20 maps the vector s into the precoded vector x with the aid of channel state information (e.g., received from the channel estimator circuitry 34). The precoded vector x is crafted such that the UEs 28 can form an estimate $\hat{s}_u \in \mathbb{C}$ of the transmitted symbol $s_u$ simply by scaling the received signal $y_u$. Specifically, it is assumed that each UE forms an estimate as $\hat{s}_u = \beta y_u$. Here, $\beta \in \mathbb{R}_+$ is a precoding factor that can be estimated at the UE using pilot-based transmission.

This section focuses on linear precoders for which it holds that x=Ps, where P$\in \mathbb{C}^{B \times U}$ is the precoding matrix. Thus, some embodiments use linear precoders that attempt to minimize the MSE between the estimated symbols s and the transmitted symbols s:

$$MSE = \mathbb{E}_{s,n}[\|s - \hat{s}\|_2^2] = \mathbb{E}_{s,n}[\|s - \beta Hx\|_2^2] + \beta^2 U N_0 \quad \text{Equation 45}$$

Minimizing Equation 45 subject to the power constraint in Equation 44 results in the so-called WF precoder, where the precoding matrix is given by $$P^{WF} = \frac{1}{\beta^{WF}} Q^{WF}$$

with:

$$Q^{WF} = (H^H H + \kappa^{WF} I_B)^{-1} H^H \quad \text{Equation 46}$$

$$\kappa^{WF} = \frac{U N_0}{P}, \text{ and } \beta^{WF} = \sqrt{\frac{tr((Q^{WF})^H Q^{WF}) E_s}{P}} \quad \text{Equation 47}$$

It is important to realize that the matrix $Q^{WF} \in \mathbb{C}^{B \times U}$ the solution of the following optimization problem:

$$Q^{WF} = \arg\min_{\tilde{Q} \in \mathbb{C}^{B \times U}} \|I_U - H\tilde{Q}\|_F^2 + \kappa^{WF}\|\tilde{Q}\|_F^2 \quad \text{Equation 48}$$

The columns $q_u^{WF} \in \mathbb{C}^B$, u=1, . . . , U, of the matrix solving:

$$q_u^{WF} = \arg\min_{\tilde{q} \in \mathbb{C}^B} \|e_u - H\tilde{q}\|_2^2 + \kappa^{WF}\|\tilde{q}\|_2^2 \quad \text{Equation 49}$$

Applying the Woodbury identity to Equation 46 yields:

$$Q^{WF} = H^H(HH^H + \kappa^{WF}I_U)^{-1} \quad \text{Equation 50}$$

which is the solution to the following optimization problem:

$$Q^{WF} = \arg\min_{\tilde{Q} \in \mathbb{C}^{B \times U}} \|I_B - \tilde{Q}H\|_F^2 + \kappa^{WF}\|\tilde{Q}\|_F^2 \quad \text{Equation 51}$$

Thus, the rows $q_b^{r,WF}$, b=1, . . . , B, of $Q^{WF}$ (where the superscript r denotes a row vector) can be computed as:

$$q_b^{r,WF} = \arg\min_{\tilde{q}^r \in \mathbb{C}^{1 \times U}} \|e_b H - \tilde{q}^r H\|_2^2 + \kappa^{WF}\|\tilde{q}^r\|_2^2 \quad \text{Equation 52}$$

The alternative optimization problems in Equation 49 and Equation 52 to compute the matrix $Q^{WF}$ will become useful in the next subsection.

B. FAWP: Finite-Alphabet WF Precoding

WF precoding computes $$x = P^{WF}s = \frac{1}{\beta^{WF}}Q^{WF}s$$

for each transmitted vector s. Unfortunately, digital precoding circuitry will be power hungry and large as mmWave MU-MIMO systems operate with high-dimensional data and extremely high sampling rates. As a remedy, FAWP proposes to represent the matrix $Q^{WF}$ using coarsely quantized numbers, with the objective of reducing the hardware complexity of the matrix-vector product $Q^{WF}s$. Unfortunately, a direct quantization of the matrix $Q^{WF}$ typically leads to a significant error-rate degradation.

In order to design low-resolution matrices that are WF-optimal, i.e., that best mimic the infinite-precision WF-precoding matrix $Q^{WF}$, finite-alphabet matrices are used, similar to those described above for spatial equalization in the mmWave MU-MIMO uplink. Since finite-alphabet matrices are applied to imitate the WF-precoding matrix $Q^{WF}$, they are referred to herein as FAWP matrices. FAWP matrices introduce a few high-resolution scaling factors that help to bring a low-resolution matrix to the right scale. Two distinct FAWP matrix structures, namely pre-FAWP and post-FAWP matrices, are considered here.

Pre-FAWP Matrix: A pre-FAWP matrix is defined as a B×U matrix with the structure:

$$Q = A \operatorname{diag}(\alpha^*) \quad \text{Equation 53}$$

where $A \in \mathcal{X}^{B \times U}$ is a low-resolution matrix with entries taken from the finite alphabet $\mathcal{X}$ and $\alpha \in \mathbb{C}^U$ is a vector with per-UE scaling factors.

By using a pre-FAWP matrix, the matrix-vector product Qs becomes $A(\operatorname{diag}(\alpha^*)s)$. Such a matrix is called pre-FAWP as the U entries of the transmitted symbol vector s are scaled by the entries of $\alpha^*$ before getting multiplied with the matrix A. Pre-FAWP reduces hardware complexity of Qs since the matrix A has low-resolution entries. Consider, for example, the case in which the entries of A are chosen from the 1-bit alphabet $\mathcal{X} = \{\pm 1 \pm j\}$; multiplying this matrix A with the vector $\operatorname{diag}(\alpha^*)s$ does not require hardware multipliers, but only adders and subtractors.

To calculate pre-FAWP matrices that are WF-optimal, the problem in Equation 49 is solved by assuming that Q has the form given by Equation 53. By doing so, the following procedure is arrived at:

The problem in Equation 48 is equivalent to solving the following optimization problem for each UE u=1, . . . , U:

$$a_u = \operatorname{argmin}_{\tilde{a} \in \mathcal{X}^B} \frac{\|H\tilde{a}\|_2^2 + \kappa^{WF}|\tilde{a}|_2^2}{|h_u^r \tilde{a}|^2} \quad \text{Equation 54}$$

Here, $a_u$ is the uth column of A, $h_u^r$ is the uth row of H, and the associated optimal scaling factor is given by:

$$\alpha_u(a_u) = \frac{h_u^r a_u}{\|Ha_u\|_2^2 + \kappa^{WF}\|a_u\|_2^2} \quad \text{Equation 55}$$

Equations 54 can be established by first plugging Equation 53 into Equation 49. Then, Equation 55 is obtained by taking the Wirtinger derivative with respect to $\alpha_n$.

Post-FAWP Matrix: A post-FAWP matrix is defined as a B×U matrix with the structure:

$$Q = \operatorname{diag}(\zeta)Z^H \quad \text{Equation 56}$$

where $Z \in \mathcal{X}^{U \times B}$ is a low-resolution matrix with entries taken from the finite alphabet $\mathcal{X}$ and $\zeta \in \mathbb{C}^B$ is a vector with per-BS-antenna scaling factors.

By using a post-FAWP matrix, the matrix-vector product Qs becomes $\operatorname{diag}(\zeta)(Z^H s)$. Such a matrix is called post-FAWP as the B scaling factors in $\zeta$ are applied after multiplying the matrix $Z^H$ with the vector s. Post-FAWP reduces the hardware complexity of Qs since the B×U matrix-vector product $Z^H s$ can be implemented using exclusively low-resolution arithmetic units. The results of $Z^H s$ are then entry-wise scaled by $\zeta$, which requires only B high-resolution scalar multiplications.

Akin to the case of pre-FAWP matrices, post-FAWP matrices are obtained that are WF-optimal by solving the problem in Equation 52 with a matrix Q that has the form given in Equation 56. By doing so, the following procedure is arrived at:

The problem in Equation 51 is equivalent to solving the following optimization problem for each BS antenna b=1, . . . , B:

$$z_b = \operatorname{argmin}_{\tilde{z} \in \mathcal{X}^U} \frac{\|H^H \tilde{z}\|_2^2 + \kappa^{WF}\|\tilde{z}\|_2^2}{|h_b^H \tilde{z}|^2} \quad \text{Equation 57}$$

Here, $z_b$ is the bth column of Z, $h_b$ is the bth column of H, and the associated optimal scaling factor is given by:

$$\zeta_b(z_b) = \frac{h_b^H z_b}{\|H^H z_b\|_2^2 + \kappa^{WF}\|z_b\|_2^2} \quad \text{Equation 58}$$

In summary, both pre-FAWP and post-FAWP matrices are composed by a low-resolution matrix and a set of scaling factors. The difference is that a pre-FAWP matrix applies its U scaling factors before the multiplication with the low-resolution matrix, whereas a post-FAWP matrix applies its B scaling factors after matrix multiplication. As B ≫ U in typical massive MU-MIMO systems, a pre-FAWP matrix performs fewer high-resolution scaling operations than a post-FAWP matrix. However, the matrix-vector product is simpler with a post-FAWP matrix than with a pre-FAWP matrix, since the vector has a lower resolution as the symbols in s are not scaled yet. Thus, neither pre-FAWP nor post-FAWP matrices have a clear advantage over the other in terms of hardware complexity. Nonetheless, both FAWP matrix structures are expected to reduce hardware complexity when compared to traditional precoding, as the low-resolution matrices in both structures have coarsely quantized entries.

Computing FAWP Matrices: Different methods are proposed to compute pre-FAWP and post-FAWP matrices defined in Equation 53 and Equation 56, respectively. Means to estimate the precoding factor $\beta$ are also discussed.

For pre-FAWP and post-FAWP matrices, the scaling factors are computed by means of Equation 55 and Equation 58, respectively, regardless of how the low-resolution matrix (A for pre-FAWP and Z for post-FAWP) is computed. Instead of solving the problems in Equation 54 or Equation 57, a simple approach is to directly quantize the infinite-precision matrix $Q^{WF}$. This approach is called FAWP-WF; more specifically, pre-FAWP-WF and post-FAW P-WF when applied to pre-FAWP and post-FAWP matrices, respectively.

$Q^{WF}$ is quantized following the method put forward in Section I. For pre-FAWP-WF, the maximum value $w_{max}$ of $[|\Re\{q_u^{WF}\}|; |\Im\{q_u^{WF}\}|]$ is found for each column $q_u^{WF}$ of $Q^{WF}$. The range $[-w_{max}, w_{max}]$ is then divided into uniform-width bins, where each bin is represented by its centroid value. The centroid values are scaled by the same factor so that they are integer numbers, which preserves the objective value in Equation 54 and results in the low-resolution entries of the column $a_u$. For post-FAWP-WF, the same procedure is applied on a per-row basis: each quantized row of $Q^{WF}$ corresponds to one row of $Z^H$.

Since the problems in Equation 54 and Equation 57 are NP-hard, FAWP-WF significantly reduces complexity. Concretely, FAWP-WF requires the same complexity of $\mathcal{O}(BU^2)$ as computing the infinite-precision $Q^{WF}$ in Equation 50. As a result, we will use FAWP-WF as a baseline to evaluate the performance of the algorithm proposed next, which tackles the problems in Equation 54 and Equation 57.

FAWP via Forward-Backward Splitting (FBS): Similar to finite-alphabet equalization matrices in Section I, the FAWP problems in Equation 54 and Equation 57 can also be approximately solved using FBS, an approach dubbed FAWP-FBS. Pre-FAWP-FBS is presented as an algorithm for computing the low-resolution part of a pre-FAWP matrix starting from the problem in Equation 54. The algorithm for post-FAWP matrices, dubbed post-FAWP-FBS, can be derived in a similar way starting from Equation 57.

As in Section I, it is assumed that the optimal objective value $\gamma_u$ of Equation 54, u=1, ..., U, is known. Then, solving the problem in Equation 54 is equivalent to solving the following problem:

$$a_u = \text{argmin}_{\tilde{a} \in \mathcal{X}^B} \frac{1}{2}\|H\tilde{a}\|_2^2 + \frac{\kappa^{WF}}{2}\|\tilde{a}\|_2^2 - \frac{\gamma_u}{2}|h_u^r\tilde{a}|^2 \quad \text{Equation 59}$$

As $\gamma_u$ is unknown, we will use it as a parameter that can be tuned to empirically improve the performance of our algorithm.

Next, the finite-alphabet constraint $\tilde{a} \in \mathcal{X}^B$ in Equation 59 is relaxed to $\tilde{a} \in \mathcal{B}^B$, where $\mathcal{B}$ represents the convex hull of $\mathcal{X}$. By doing so, the all-zeros vector $0_{B \times 1}$ becomes a trivial solution. To avoid this solution, the term $$-\frac{\delta}{2}\|\tilde{a}\|_2^2,$$

with $\delta > 0$, is included in Equation 59 to encourage large entries in the vector $\tilde{a}$. The resulting optimization problem is:

$$a_u = \text{argmin}_{\tilde{a} \in \mathcal{B}^B} \frac{1}{2}\|H\tilde{a}\|_2^2 - \frac{\gamma_u}{2}|h_u^r\tilde{a}|^2 + \frac{\kappa^{WF} - \delta}{2}\|\tilde{a}\|_2^2 \quad \text{Equation 60}$$

Now FBS can be applied. FBS is an efficient procedure for solving convex problems of the form $\hat{a} = \arg\min_{\tilde{a}} f(\tilde{a}) + g(\tilde{a})$, where both functions $f$ and $g$ are convex, but $f$ is smooth and $g$ is not necessarily smooth or bounded. FBS is an iterative method that runs for $t_{max}$ iterations or until convergence. In each iteration t, FBS computes:

$$\tilde{v}^{(t+1)} = \tilde{a}^{(t)} - \tau^{(t)} \nabla f(\tilde{a}^{(t)}) \quad \text{Equation 61}$$

$$\tilde{a}^{(t+1)} = \text{prox}_g(\tilde{v}^{(t+1)}; \tau^{(t)}) \quad \text{Equation 62}$$

where $\nabla f(\tilde{a}^{(t)})$ is the gradient of the function $f$ and $\{\tau^{(t)} > 0\}$ is a sequence of step sizes. The proximal operator of the function g is defined as $$\text{prox}_g(\tilde{v}; \tau) = \text{argmin}_{\tilde{a}}\left\{\tau g(\tilde{a}) + \frac{1}{2}|\tilde{a} - \tilde{v}|_2^2\right\}.$$

Since the problem in Equation 60 is non-convex, FBS is not guaranteed to converge to an optimal solution. Nevertheless, FBS is used to approximately solve Equation 60 by setting:

$$f(\tilde{a}) = \frac{1}{2}\|H\tilde{a}\|_2^2 - \frac{\gamma_u}{2}|h_u^r\tilde{a}|^2 \quad \text{Equation 63}$$

$$g(\tilde{a}) = \mathbb{I}_{\mathcal{B}^B}(\tilde{a}) + \frac{\kappa^{WF} - \delta}{2}\|\tilde{a}\|_2^2 \quad \text{Equation 64}$$

where $\mathbb{I}_{\mathcal{B}^B}(\tilde{a})$ is the indicator function, which is zero if $\tilde{a} \in \mathcal{B}^B$ and infinity otherwise. The indicator function is used to incorporate the convex constraint $\tilde{a} \in \mathcal{B}^B$ in Equation 60 into the function $g(\tilde{a})$. These choices for $f(\tilde{a})$ and $g(\tilde{a})$ result in:

$$\nabla f(\tilde{a}) = H^H H \tilde{a} - \gamma_u (h_u^r)^H h_u^r \tilde{a} \quad \text{Equation 65}$$

$$\text{prox}_g(\tilde{v}) = \text{sgn}(\Re\{\tilde{v}\})\min\{\nu^{(t)}|\Re\{\tilde{v}\}|, 1\} + j\,\text{sgn}(\Im\{\tilde{v}\})\min\{\nu^{(t)}|\Im\{\tilde{v}\}|, 1\} \quad \text{Equation 66}$$

where $\nu^{(t)} = (1 + \tau^{(t)}(\kappa^{WF} - \delta))^{-1}$ and Equation 66 is applied element-wise to $\tilde{v}$. Pre-FAWP-FBS can be summarized as follows:

---

Algorithm 2 (Pre-FAWP-FBS). Initialize $\tilde{a}^{(1)}$ with either the maximum-ratio transmission (MRT) solution $(h_u^r)^H$ or the pre-FAWP-WF solution $a_u^{WF}$, and fix the sets of parameters $\{\tau_{(t)}\}$, $\{\nu_{(t)}\}$, and $\{\gamma_{(t)}\}$. Then, for every iteration t = 1, ..., $t_{max}$, compute:
  $\tilde{v}^{(t+1)} = (I_B - \tau^{(t)} H^H (I_U - \gamma^{(t)} e_u e_u^H) H) \tilde{a}^{(t)}$  Equation 67
  $\tilde{a}^{(t+1)} = \text{prox}_g(\tilde{v}^{(t+1)})$  Equation 68
The result $\tilde{x}^{(t_{max}+1)}$ is projected onto the finite alphabet $\mathcal{X}$ to obtain $a_u$. The optimal scalar au is computed using Equation 55. This procedure is repeated for each UE u = 1, ..., U.

---

To tune the algorithm parameters $\{\tau^{(t)}\}$, $\{\nu^{(t)}\}$, and $\{\gamma^{(t)}\}$, some embodiments use a neural-network-based approach.

Note that $\gamma_u$ is replaced with $\gamma^{(t)}$ in Algorithm 2 in order to (i) keep the algorithm general for different user locations and (ii) to increase flexibility during optimization.

Post-FAWP-FBS is now summarized, which can be derived following similar steps as for the derivation of pre-FAWP-FBS.

---

Algorithm 3 (Post-FAWP-FBS). Initialize $\tilde{z}^{(1)}$ with either the MRT solution $h_b$ or the post-FAWP-WF solution $z^{WF}{}_b$, and fix the sets of parameters $\{\tau^{(t)}\}$, $\{v^{(t)}\}$, and $\{\gamma^{(t)}\}$. Then, for every iteration $t = 1, \ldots, t_{max}$, compute:

$\tilde{v}^{(t+1)} = (I_U - \tau^{(t)}H(I_B - \gamma^{(t)}e_b e_b^H)H^H)\tilde{z}^{(t)}$  Equation 69

$\tilde{z}^{(t+1)} = \text{prox}_g(\tilde{v}^{(t+1)})$  Equation 70

The result $z^{(tmax+1)}$ is projected onto the finite alphabet $\mathcal{X}$ to obtain $z_b$. The optimal scalar $\zeta_b$ is computed using Equation 58. This procedure is repeated for each BS antenna $b = 1, \ldots, B$.

---

We note that both FAWP-FBS algorithms have the same complexity order of $\mathcal{O}(BU^2)$ as WF and FAWP-WF.

While the BS is able to compute the precoding factor $\beta$ via Equation 47 with a FAWP matrix Q instead of $Q^{WF}$, the UEs need to estimate such precoding factor in order to correctly estimate the transmitted symbols in s. Estimation can be achieved in a block-fading scenario by transmitting a pilot symbol that is known at the UE side. Specifically, the BS will transmit the pilot $s_u = \sqrt{E_s}$, $u = 1, \ldots, U$. Then, the uth UE will receive $y_u = \beta^{-1}h_u^r q_u s_u + \check{e}_u + n_u$, where $\check{e}_u$ represents residual interference from the other UEs. The objective now is for the UE to find a $\hat{\beta}_u \in \mathbb{R}_+$ such that it generates an unbiased estimate $\hat{s}_u$ of $s_u$, i.e., $\hat{s}_u = \hat{\beta}_u y_u \approx s_u$.

By taking into account that the transmitted pilot symbol $s_u$ is known to be $\sqrt{E_s}$ and by assuming that $\check{e}_u + n_u$ is zero-mean Gaussian distributed and independent of $s_u$, the UE can compute a maximum likelihood estimate (MLE) of $\hat{\beta}_u$ as:

$\hat{\beta}_u^{MLE} = \mathbb{R}\{\sqrt{E_s}/y_u\}$  Equation 71

While more pilots could be transmitted to form a better estimate $\hat{\beta}_u^{MLE}$, the results in Subsection C below show that one pilot is sufficient to achieve reliable downlink communication.

C. Evaluation

Simulation results for both pre-FAWP and post-FAWP matrices are generated by either FAWP-WF or FAWP-FBS. A comparison is provided in terms of BER and EVM versus normalized transmit power, defined as $P/N_0$. For simplicity, the evaluation is restricted to a mmWave system with B=256 BS antennas serving U=16 UEs in a 16-QAM system operating over an i.i.d. Rayleigh-fading channel.

Figure 10B:
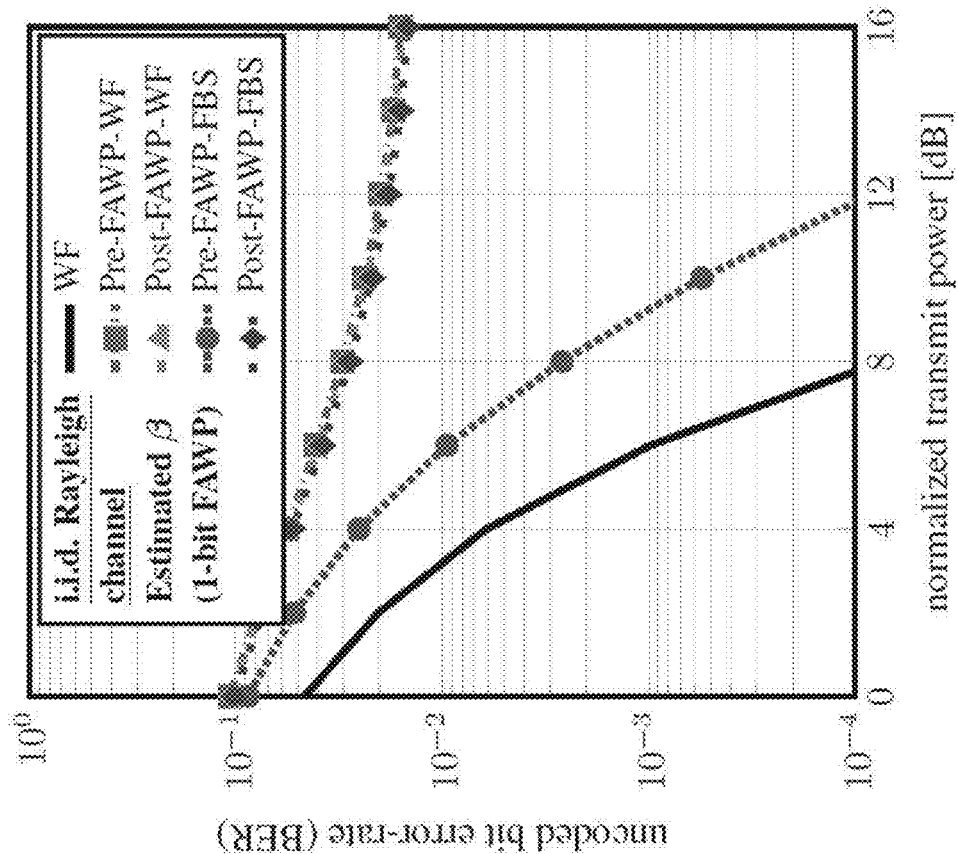
FIG. 10B is a graphical representation of uncoded BER for the finite-alphabet precoder with estimated UE-side precoding factor/using one pilot.
Figure 10A:
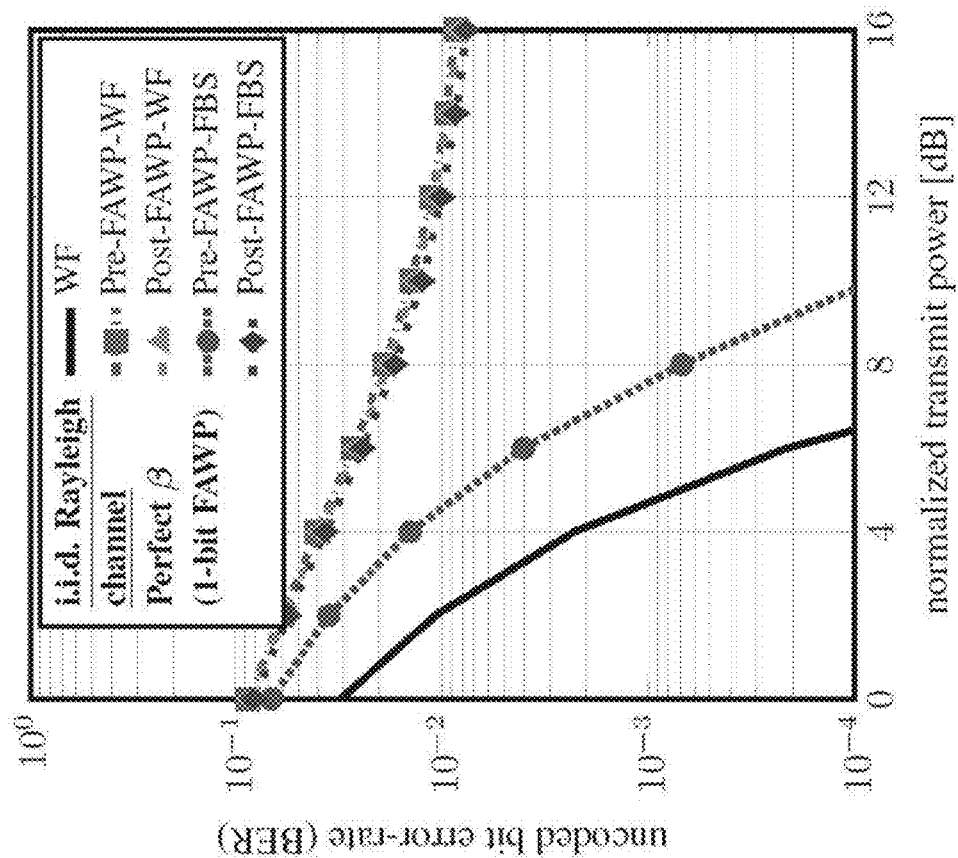
FIG. 10A is a graphical representation of uncoded BER for a finite-alphabet precoder assuming perfect knowledge of a UE-side precoding factor $\beta$.

FIG. 10A is a graphical representation of uncoded BER for a finite-alphabet precoder 24 assuming perfect knowledge of the UE-side precoding factor $\beta$. Each of the FAWP-based approaches use 1-bit FAWP matrices. Pre- and post-FAWP-FBS are run for $t_{max}=10$ iterations starting from the MRT solution $H^H$. FIG. 10A considers a case where the UEs have genie-aided access to the exact $\hat{\beta}_u$ precoding scaling factor. Here, both FAWP-WF approaches result in an error floor. In fact, the FAWP-WF precoders are significantly outperformed by pre-FAWP-FBS, which computes WF-optimal pre-FAWP matrices. However, post-FAWP-FBS is unable to outperform post-FAWP-WF. Hence, post-FAWP-FBS is excluded in the ensuing discussion.

FIG. 10B is a graphical representation of uncoded BER for the finite-alphabet precoder 24 with estimated UE-side precoding factor $\beta$ using one pilot. This example uses the same scenario as FIG. 10A, but this time $\hat{\beta}_u$ is estimated from a single pilot transmission. As illustrated, all precoders (including the infinite-precision WF) suffer from roughly a 2 dB loss. In what follows, it is assumed that $\hat{\beta}_u$ is estimated using a single pilot.

Figure 11A:
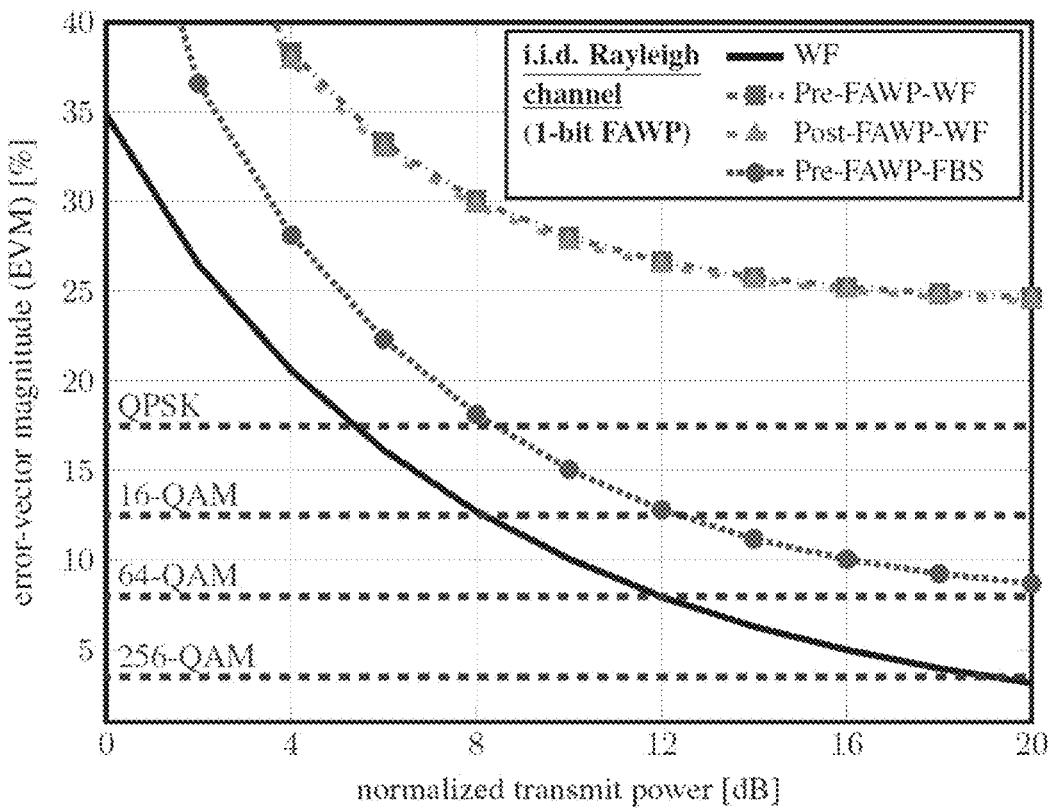
FIG. 11A is a graphical representation of EVM for the different finite-alphabet Wiener filter precoding (FAWP) precoders of FIG. 10B and a 1-bit alphabet.
Figure 11B:
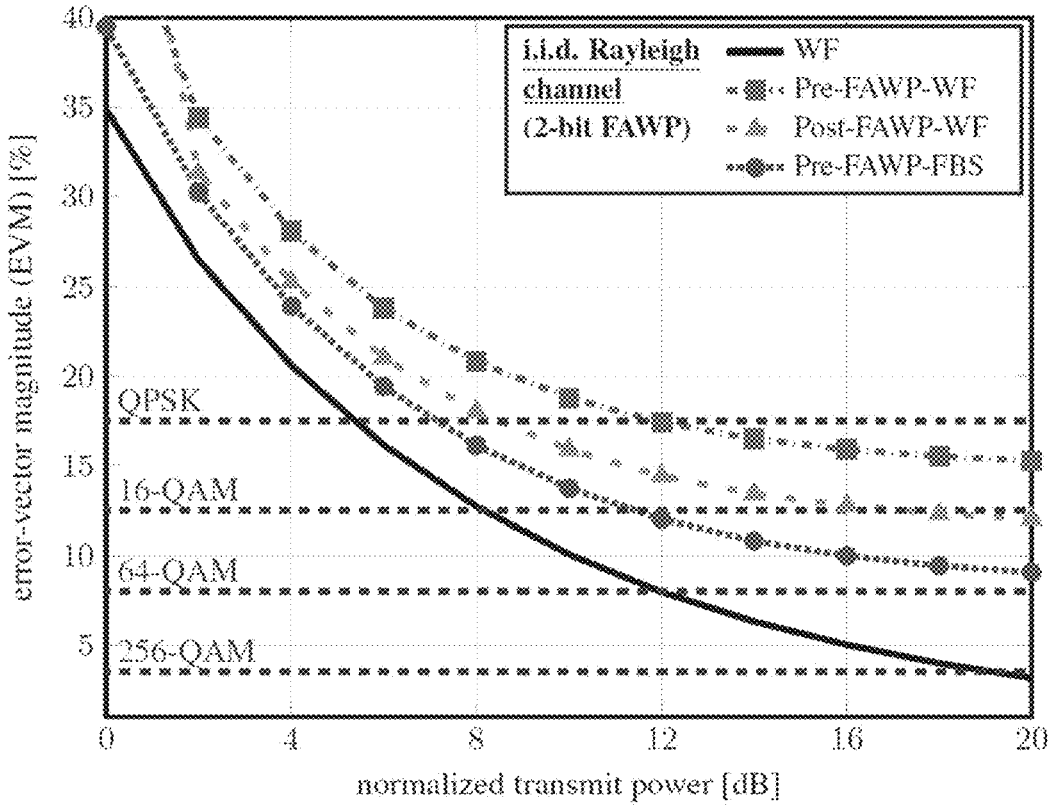
FIG. 11B is a graphical representation of EVM for the different FAWP precoders of FIG. 10B and a 2-bit alphabet.
Figure 11C:
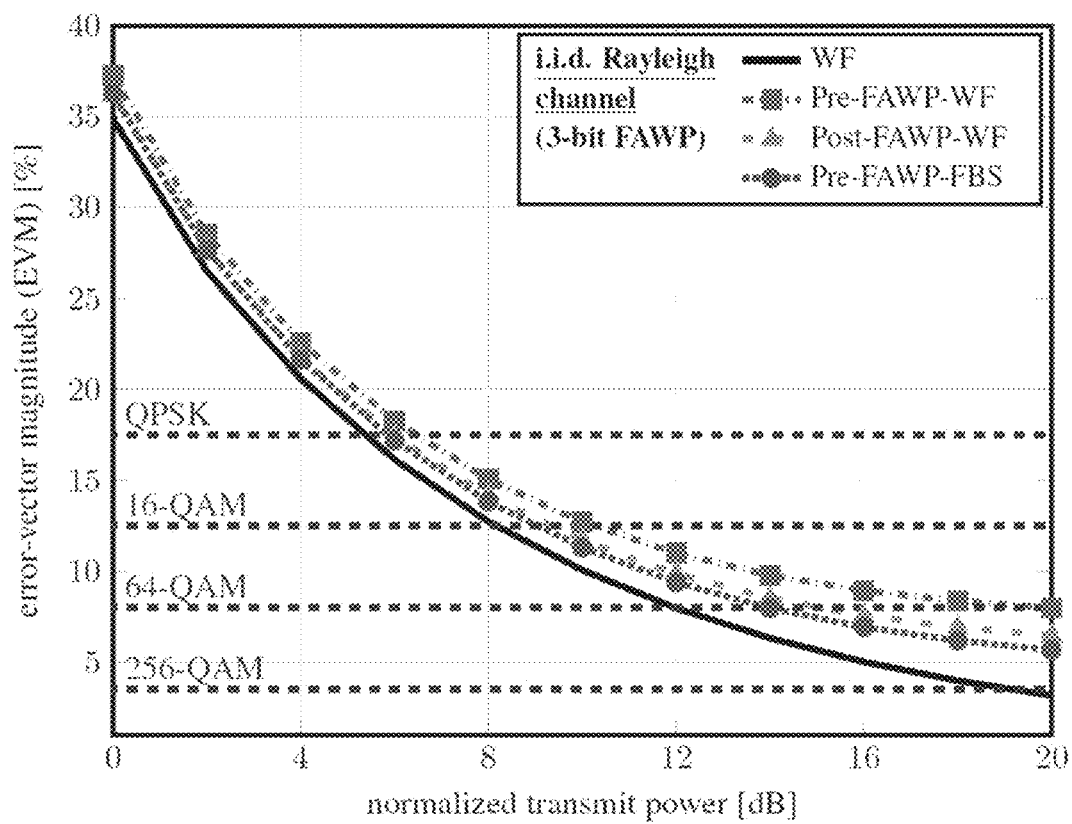
FIG. 11C is a graphical representation of EVM for the different FAWP precoders of FIG. 10B and a 3-bit alphabet.

FIG. 11A is a graphical representation of EVM for the different FAWP precoders of FIG. 10B and a 1-bit alphabet. FIG. 11B is a graphical representation of EVM for the different FAWP precoders of FIG. 10B and a 2-bit alphabet. FIG. 11C is a graphical representation of EVM for the different FAWP precoders of FIG. 10B and a 3-bit alphabet. The dashed horizontal lines represent the EVM requirements established by the 3GPP 5G NR technical specification. For $\{2,3\}$-bit FAWP, pre-FAWP-FBS is initialized with the MRT solution $H^H$ and runs for $t_{max}=5$ iterations.

FIG. 11A confirms what was previously observed in FIGS. 10A-10B for the 1-bit alphabet. While FAWP-WF suffers a high error-floor that prevents such approach from reaching the EVM requirement even for QPSK, pre-FAWP-FBS almost meets the EVM requirement for 64-QAM. By increasing the number of bits used for the finite alphabet, the gap between the FAWP approaches and the infinite-precision WF decreases—to the point shown in FIG. 11C where all FAWP approaches meet the 64-QAM EVM requirement when using a 3-bit alphabet. It is interesting to observe that post-FAWP-WF outperforms pre-FAWP-WF when using finite alphabets with more than 1 bit. Nonetheless, post-FAWP-WF does not outperform pre-FAWP-FBS.

Figure 12B:
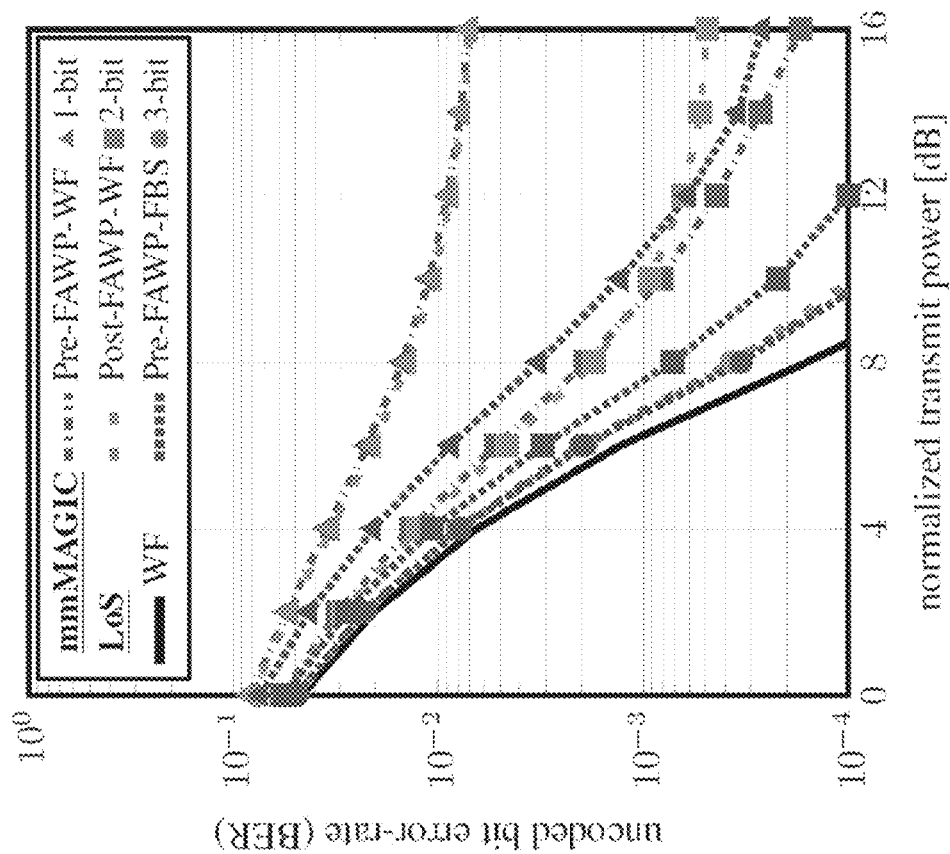
FIG. 12B is a graphical representation of uncoded BER using the LoS QuaDRiGa mmWave channel model for the different FAWP precoders of FIGS. 11A-11C.
Figure 12A:
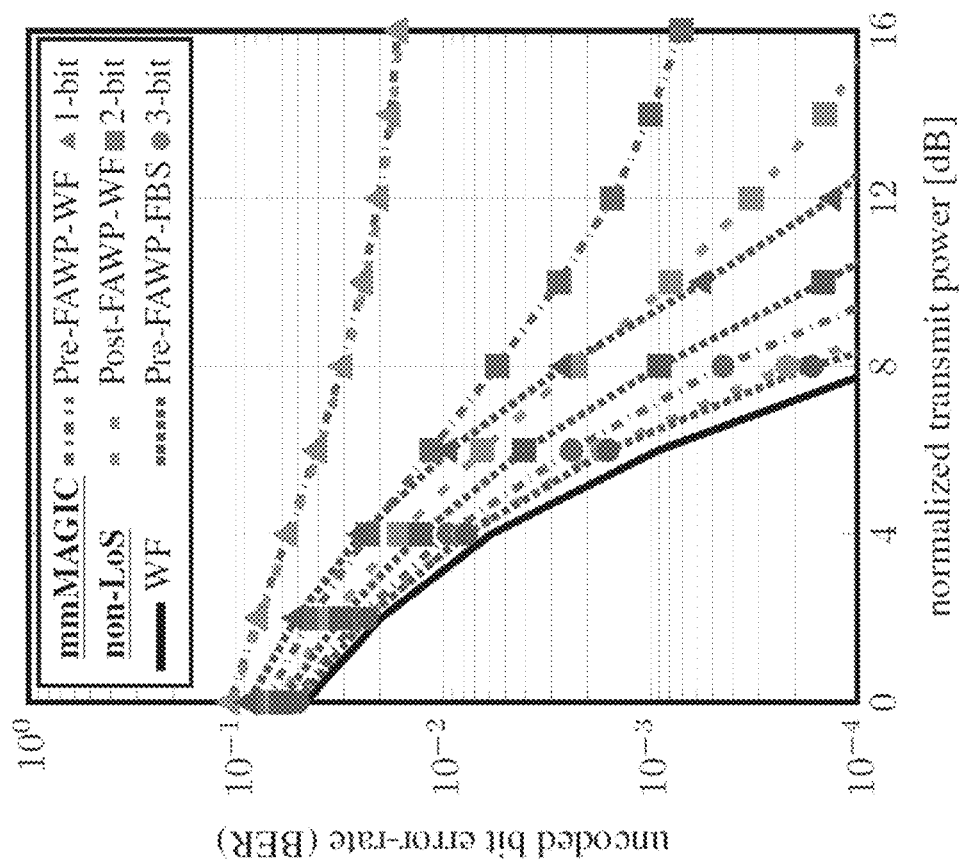
FIG. 12A is a graphical representation of uncoded BER using the non-LoS QuaDRiGa mmWave channel model for the different FAWP precoders of FIGS. 11A-11C.

With reference to FIGS. 12A and 12B, FAWP is evaluated under more realistic mmWave propagation conditions. The QuaDRiGa mmWave channel model is used to simulate communication in the "mmMAGIC†_UMi" scenario when using a 60 GHz carrier frequency for both non-LoS and LoS propagation conditions. The UEs are randomly placed 10 m to 110 m away from the BS in a 120° circular sector, with a minimum angular separation of 4°. Furthermore, perfect power control is assumed, i.e., all the users receive the same signal power.

FIG. 12A is a graphical representation of uncoded BER using the non-LoS QuaDRiGa mmWave channel model for the different FAWP precoders of FIGS. 11A-11C. FIG. 12B is a graphical representation of uncoded BER using the LoS QuaDRiGa mmWave channel model for the different FAWP precoders of FIGS. 11A-11C. The trends observed in the i.i.d. Rayleigh-fading scenario are confirmed. Pre-FAWP-FBS is able to outperform both FAWP-WF precoders, although the gains of the former (as well as the gap to the WF precoder) reduce when using more bits for the finite alphabet. An interesting observation is that, for the LoS scenario illustrated in FIG. 12B, the performance of pre-FAWP-WF is on par with that of post-FAWP-WF, which was not the case for the non-LoS and i.i.d. Rayleigh-fading scenarios. Regardless, the results in FIGS. 12A and 12B demonstrate that FAWP performs well with realistic mmWave channels, such that FAWP enables low-power and area-efficient precoding circuitry.

*****

Figure 13:
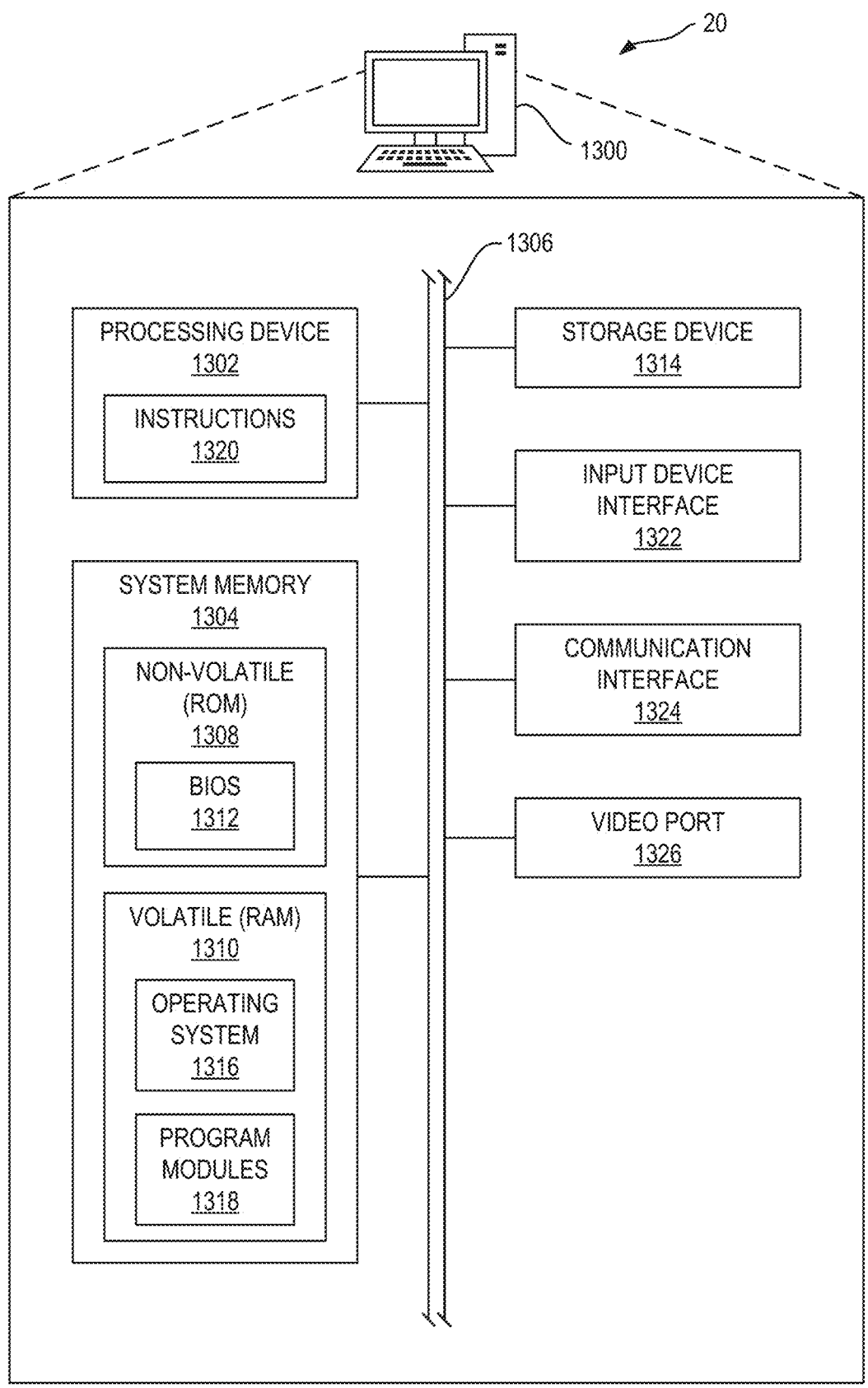
FIG. 13 is a block diagram of the radio access node of FIG. 2 suitable for implementing digital beamforming of signals according to embodiments disclosed herein.

FIG. 13 is a block diagram of the radio access node 20 of FIG. 2 suitable for implementing digital beamforming of signals according to embodiments disclosed herein. The radio access node 20 includes or is implemented as a computer system 1300, which comprises any computing or electronic device capable of including firmware, hardware, and/or executing software instructions that could be used to perform any of the methods or functions described above, such as FAME equalization and/or FAWP precoding. In this regard, the computer system 1300 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1300 in this embodiment includes a processing device 1302 or processor, a system memory 1304, and a system bus 1306. The system memory 1304 may include non-volatile memory 1308 and volatile memory 1310. The non-volatile memory 1308 may include read-only memory (ROM), erasable programmable read-only memory (EPROM), electrically erasable programmable read-only memory (EEPROM), and the like. The volatile memory 1310 generally includes random-access memory (RAM) (e.g., dynamic random access memory (DRAM), such as synchronous DRAM (SDRAM)). A basic input/output system (BIOS) 1312 may be stored in the non-volatile memory 1308 and can include the basic routines that help to transfer information between elements within the computer system 1300.

The system bus 1306 provides an interface for system components including, but not limited to, the system memory 1304 and the processing device 1302. The system bus 1306 may be any of several types of bus structures that may further interconnect to a memory bus (with or without a memory controller), a peripheral bus, and/or a local bus using any of a variety of commercially available bus architectures.

The processing device 1302 represents one or more commercially available or proprietary general-purpose processing devices, such as a microprocessor, central processing unit (CPU), or the like. More particularly, the processing device 1302 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1302 is configured to execute processing logic instructions for performing the operations and steps discussed herein.

In this regard, the various illustrative logical blocks, modules, and circuits described in connection with the embodiments disclosed herein may be implemented or performed with the processing device 1302, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 1302 may be a microprocessor, or may be any conventional processor, controller, microcontroller, or state machine. The processing device 1302 may also be implemented as a combination of computing devices (e.g., a combination of a DSP and a microprocessor, a plurality of microprocessors, one or more microprocessors in conjunction with a DSP core, or any other such configuration).

The computer system 1300 may further include or be coupled to a non-transitory computer-readable storage medium, such as a storage device 1314, which may represent an internal or external hard disk drive (HDD), flash memory, or the like. The storage device 1314 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 1316 and any number of program modules 1318 or other applications can be stored in the volatile memory 1310, wherein the program modules 1318 represent a wide array of computer-executable instructions corresponding to programs, applications, functions, and the like that may implement the functionality described herein in whole or in part, such as through instructions 1320 on the processing device 1302. The program modules 1318 may also reside on the storage mechanism provided by the storage device 1314. As such, all or a portion of the functionality described herein may be implemented as a computer program product stored on a transitory or non-transitory computer-usable or computer-readable storage medium, such as the storage device 1314, volatile memory 1308, non-volatile memory 1310, instructions 1320, and the like. The computer program product includes complex programming instructions, such as complex computer-readable program code, to cause the processing device 1302 to carry out the steps necessary to implement the functions described herein.

An operator, such as the user, may also be able to enter one or more configuration commands to the computer system 1300 through a keyboard, a pointing device such as a mouse, or a touch-sensitive surface, such as the display device, via an input device interface 1322 or remotely through a web interface, terminal program, or the like via a communication interface 1324. The communication interface 1324 may be wired or wireless and facilitate communications with any number of devices via a wireless communications system 18 in a direct or indirect fashion. An output device, such as a display device, can be coupled to the system bus 1306 and driven by a video port 1326. Additional inputs and outputs to the computer system 1300 may be provided through the system bus 1306 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for digitally beamforming signals for an antenna array, the method comprising:
    estimating a wireless channel associated with a plurality of digital baseband signals and an antenna array to produce estimates of the wireless channel; and
    beamforming, with a finite-alphabet equalizer, the plurality of digital baseband signals based on the estimates of the wireless channel;

wherein the plurality of digital baseband signals is beamformed at a given resolution less than a resolution of the estimates of the wireless channel.

2. The method of claim 1, further comprising determining digital beamforming weights which are optimized for the given resolution;
wherein beamforming the plurality of digital baseband signals comprises steering the plurality of digital baseband signals with the digital beamforming weights.

3. The method of claim 2, further comprising adjusting the digital beamforming weights in response to new estimates of the wireless channel.

4. The method of claim 1, further comprising receiving a sequential array of digital signal samples corresponding to the antenna array and comprising the plurality of digital baseband signals.

5. The method of claim 4, wherein the sequential array of digital signal samples is received from analog-to-digital converter circuitry coupled to the antenna array.

6. The method of claim 4, wherein beamforming the plurality of digital baseband signals comprises recovering received user equipment signals from the sequential array of digital signal samples.

7. The method of claim 1, further comprising providing a sequential array of digital signal samples comprising the plurality of digital baseband signals to be transmitted via the antenna array.

8. The method of claim 7, wherein providing the sequential array of digital signal samples comprises providing the sequential array of digital signal samples to digital-to-analog converter circuitry coupled to the antenna array.

9. The method of claim 7, wherein beamforming the plurality of digital baseband signals comprises precoding each of the plurality of digital baseband signals by weighting the sequential array of digital signal samples.

10. The method of claim 1, wherein the plurality of digital baseband signals is represented by a received channel matrix.

11. The method of claim 10, wherein beamforming the plurality of digital baseband signals comprises performing a vector product of the received channel matrix and an equalization matrix.

12. The method of claim 11, wherein:
estimating the wireless channel comprises providing a channel matrix; and
the method further comprises determining the equalization matrix based on the channel matrix.

13. The method of claim 12, further comprising adjusting the equalization matrix to minimize a post-equalization mean square error of the plurality of digital baseband signals.

14. A radio access node, comprising:
an antenna array;
channel estimator circuitry coupled to the antenna array and configured to provide an estimate of a wireless channel associated with a plurality of digital baseband signals for the antenna array;
finite-alphabet beamforming circuitry coupled to the antenna array and the channel estimator circuitry, wherein:
the finite-alphabet beamforming circuitry is configured to beamform the plurality of digital baseband signals in accordance with the estimate of the wireless channel; and
the finite-alphabet beamforming circuitry comprises a finite-alphabet precoder configured to beamform a sequential array of digital signal samples; and
processing circuitry coupled to the finite-alphabet precoder and configured to determine a precoder matrix applied to the sequential array of digital signal samples.

15. The radio access node of claim 14, wherein:
the finite-alphabet beamforming circuitry comprises a finite-alphabet equalizer configured to beamform the sequential array of digital signal samples; and
the processing circuitry is coupled to the finite-alphabet equalizer and configured to determine an equalization matrix applied to the sequential array of digital signal samples.

16. The radio access node of claim 15, further comprising analog-to-digital circuitry configured to provide the sequential array of digital signal samples corresponding to antennas of the antenna array.

17. The radio access node of claim 14, further comprising digital-to-analog circuitry configured to provide analog signals to be transmitted by the antenna array from the sequential array of digital signal samples.

18. The radio access node of claim 14, wherein the finite-alphabet beamforming circuitry has a resolution of 8 bits or less.

19. The radio access node of claim 18, wherein the finite-alphabet beamforming circuitry has a resolution of 3 bits or less.

20. The radio access node of claim 14, wherein the antenna array comprises at least 64 antennas.

21. A radio access node, comprising:
an antenna array;
channel estimator circuitry coupled to the antenna array and configured to provide an estimate of a wireless channel associated with a plurality of digital baseband signals for the antenna array; and
finite-alphabet beamforming circuitry coupled to the antenna array and the channel estimator circuitry, the finite-alphabet beamforming circuitry being configured to beamform the plurality of digital baseband signals in accordance with the estimate of the wireless channel and at a given resolution less than a resolution of the estimate of the wireless channel.

* * * * *